(12) United States Patent
Wu et al.

(10) Patent No.: US 11,836,499 B2
(45) Date of Patent: Dec. 5, 2023

(54) SYSTEM AND METHOD OF OPERATING SYSTEM EXECUTABLES WITH INFORMATION HANDLING SYSTEMS (IHS)

(71) Applicant: Dell Products L.P., Round Rock, TX (US)

(72) Inventors: Dongli Wu, Allen, TX (US); Brijesh Kumar Mishra, Murphy, TX (US); James Darrell Testerman, McKinney, TX (US); Sai Sivakumar Dhakshinamurthy, Frisco, TX (US); Kristopher Anthony Slocum, Sachse, TX (US)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 17/644,715

(22) Filed: Dec. 16, 2021

(65) Prior Publication Data

US 2023/0195472 A1 Jun. 22, 2023

(51) Int. Cl.
*G06F 9/4401* (2018.01)
*G06F 3/06* (2006.01)
*G06F 9/48* (2006.01)

(52) U.S. Cl.
CPC .......... *G06F 9/4403* (2013.01); *G06F 3/0604* (2013.01); *G06F 3/0659* (2013.01); *G06F 3/0673* (2013.01); *G06F 9/4411* (2013.01); *G06F 9/4416* (2013.01); *G06F 9/485* (2013.01)

(58) Field of Classification Search
CPC .... G06F 9/4403; G06F 3/0604; G06F 3/0659; G06F 3/0673; G06F 9/4411; G06F 9/4416; G06F 9/485
See application file for complete search history.

(56) References Cited

U.S. PATENT DOCUMENTS

| | | | | |
|---|---|---|---|---|
| 8,316,248 B2* | 11/2012 | Yokota | ................... | G06F 9/5027 709/224 |
| 8,418,226 B2* | 4/2013 | Gardner | ................ | G06F 21/552 711/149 |
| 8,868,933 B2* | 10/2014 | Gardner | .................. | G06F 21/73 709/202 |
| 9,465,959 B2* | 10/2016 | Gardner | ................ | G06F 21/575 |

(Continued)

*Primary Examiner* — Tammara R Peyton
(74) *Attorney, Agent, or Firm* — McDermott Will & Emery LLP

(57) ABSTRACT

In one or more embodiments, one or more systems, one or more methods, and/or one or more methods may: execute a first information handling system (IHS) initialization executable via an environment associated with IHS firmware; register, by the first IHS initialization executable, a process configured to store multiple IHS initialization executable/OS executable pairs via a volatile memory medium of the IHS; for each IHS initialization executable/OS executable pair of the multiple IHS initialization executable/OS executable pairs: call, by an IHS initialization executable of the IHS initialization executable/OS executable pair, the process; and copy, by the process, an OS executable of the IHS initialization executable/OS executable pair from the first non-volatile memory medium to the volatile memory medium; retrieve a driver via a network; execute the driver; and copy, by the driver, each OS executable, which was copied to the volatile memory medium, to a non-volatile memory medium of the IHS.

20 Claims, 18 Drawing Sheets

(56) References Cited

U.S. PATENT DOCUMENTS

| | | | |
|---|---|---|---|
| 2001/0039612 A1* | 11/2001 | Lee | G06F 9/4406 713/2 |
| 2009/0063810 A1* | 3/2009 | Garcia-Tobin | G06F 12/0638 711/E12.078 |
| 2014/0101535 A1* | 4/2014 | Kim | G06F 3/04886 715/761 |
| 2020/0134185 A1* | 4/2020 | Cho | G06F 21/602 |

* cited by examiner

SYSTEM AND METHOD OF OPERATING SYSTEM EXECUTABLES WITH INFORMATION HANDLING SYSTEMS (IHS)

BACKGROUND

Field of the Disclosure

This disclosure relates generally to information handling systems and more particularly to utilizing operating system executables with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may execute, by at least one processor of an information handling system (IHS), at least a portion of IHS firmware (IHSFW) from a first non-volatile memory medium of the IHS; may retrieve, from the first non-volatile memory medium, a first IHS initialization executable and an operating system setup executable; may execute, by the at least one processor, the first IHS initialization executable via an environment associated with the IHSFW; may register, by the first IHS initialization executable, a process configured to store multiple IHS initialization executable/OS executable pairs via a volatile memory medium of the IHS; may copy, by the first IHS initialization executable, the operating system setup executable from the first non-volatile memory medium to the volatile memory medium; for each IHS initialization executable/OS executable pair of the multiple IHS initialization executable/OS executable pairs: may retrieve, from the first non-volatile memory medium, an IHS initialization executable of the IHS initialization executable/OS executable pair; may execute, by the at least one processor, the IHS initialization executable via the environment associated with the IHSFW; may call, by the IHS initialization executable, the process; and may copy, by the process, an OS executable of the IHS initialization executable/OS executable pair from the first non-volatile memory medium to the volatile memory medium; may execute, by the at least one processor, the operating system setup executable; may retrieve, by the operating system setup executable, a driver via a network; may execute, by the at least one processor, the driver; and may copy, by the driver, each OS executable, which was copied to the volatile memory medium, to a second non-volatile memory medium of the IHS.

In one or more embodiments, copying, by the process, the OS executable of the IHS initialization executable/OS executable pair from the first non-volatile memory medium to the volatile memory medium may include copying, by the process, the IHS initialization executable/OS executable pair from the first non-volatile memory medium to the volatile memory medium. In one or more embodiments, the one or more systems, the one or more methods, and/or the one or more processes may further execute, by the at least one processor, each OS executable, which was copied to the second non-volatile memory medium, via an operating system context of an operating system. For example, executing, by the at least one processor, each OS executable, which was copied to the second non-volatile memory medium, via the operating system context of the operating system may include executing, by the at least one processor, each OS executable, which was copied to the second non-volatile memory medium, via the operating system context of the operating system without executing an operating system setup executable configured to set up the OS executable.

In one or more embodiments, retrieving, by the first OS executable, the driver via the network may include retrieving, by the first OS executable, the driver from a baseboard management controller of the IHS via the network or from another IHS via the network. In one or more embodiments, copying, by the process, the OS executable of the IHS initialization executable/OS executable pair from the first non-volatile memory medium to the volatile memory medium may include copying, by the process, the OS executable of the IHS initialization executable/OS executable pair from the first non-volatile memory medium to an entry of a data structure stored by the volatile memory medium. For example, copying, by the driver, each OS executable, which was copied to the volatile memory medium, to the second non-volatile memory medium may include for each entry of the data structure: copying, by the driver, the OS executable from the entry of the data structure to the second non-volatile memory medium.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
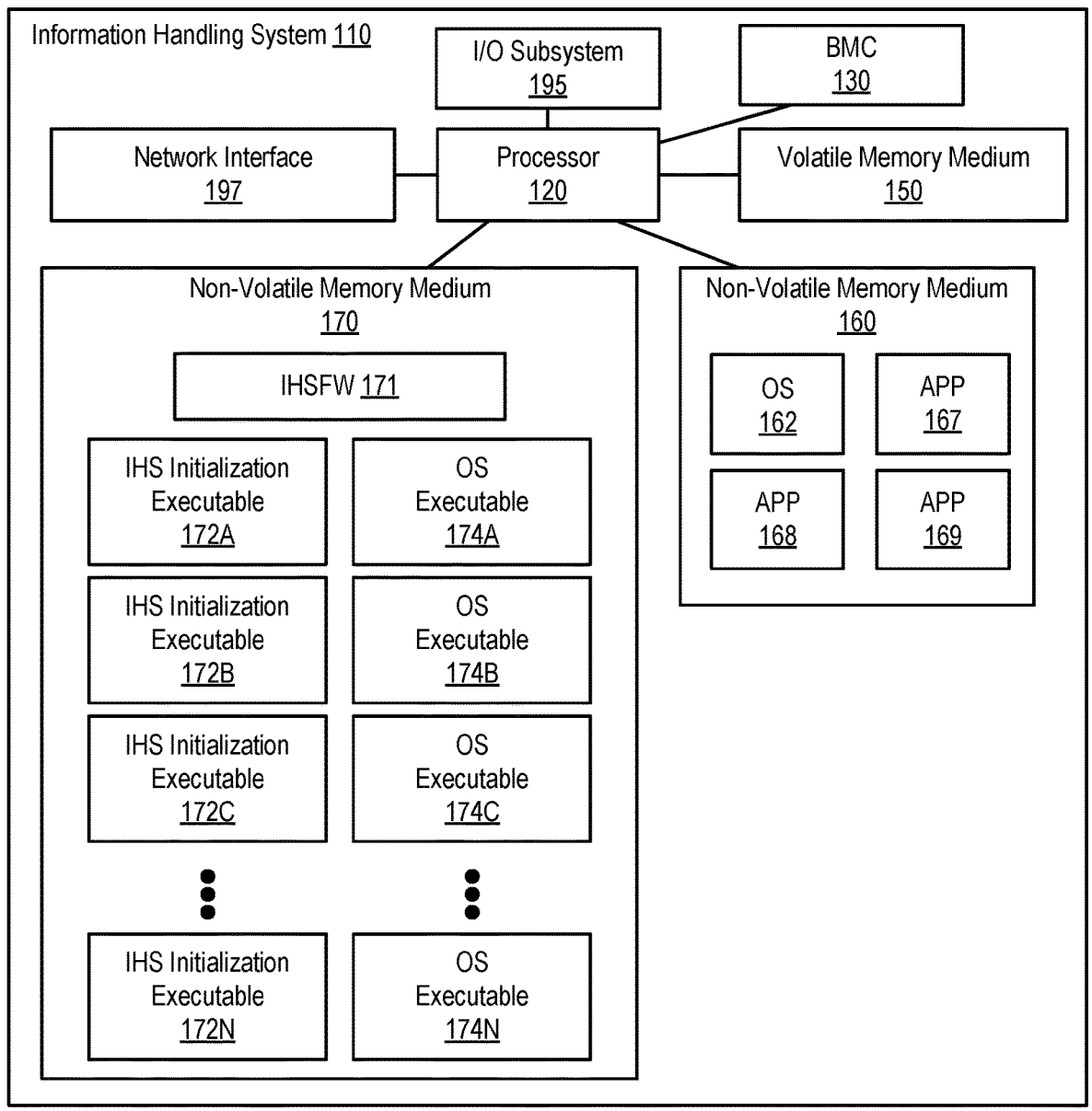
FIG. 1A illustrates examples of information handling systems, according to one or more embodiments.
Figure 1A:
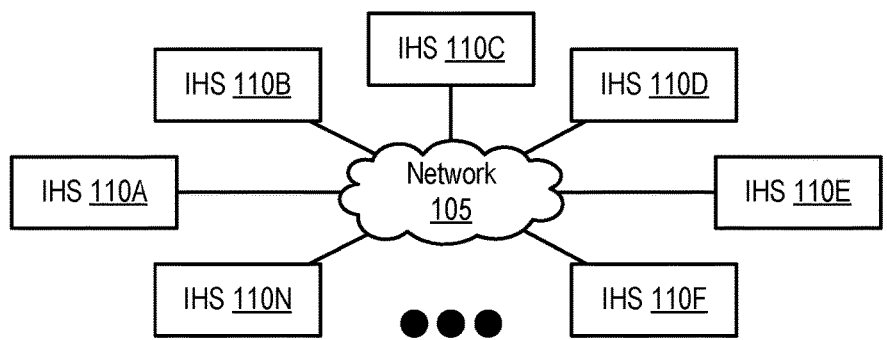

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an operating system (OS) may provide a capability, in a new installation or in a reinstallation, which works in conjunction with information handling system firmware (IHSFW) to execute an IHSFW-based platform application. In one example, a platform application may enable an information handling system (IHS) manufacturer with an option to install an application on an IHS where existing applications of the OS may not be adequate. For instance, the platform application may be configured to accommodate specific characteristics of an IHS, such as specific characteristic of a hardware component of the IHS. In another example, the platform application may enable persistence of an OS executable across OS installations and/or non-volatile memory medium replacement or reformatting. In one or more embodiments, the platform application may be installed after the OS is installed or after the OS is reinstalled. In one example, in this fashion, the platform application may have continuity across multiple OS installations on same or different non-volatile memory media (e.g., solid state drive(s), hard drive(s), etc.). In a second example, in this fashion, the platform application may endure across multiple OS installations on same or different non-volatile memory media (e.g., solid state drive(s), hard drive(s), etc.). In another example, in this fashion, the platform application may be installed or reinstalled across multiple OS installations on same or different non-volatile memory media (e.g., solid state drive(s), hard drive(s), etc.).

In one or more embodiments, multiple platform applications may be installed via a platform application controller. For example, the OS may instruct a processor of the IHS to execute the platform application controller. For instance, the platform application controller may include one or more structures and/or one or more functionalities of a session manager. In one or more embodiments, the session manager may instruct the processor to execute multiple additional platform applications.

In one or more embodiments, a first data structure may be populated with a platform application. For example, the first data structure may include a first table. In one instance, the first table may be compliant with an Advanced Configuration and Power Interface (ACPI) table. In another instance, the first table may be or may include an ACPI table. In one or more embodiments, the first data structure may be populated with a first OS executable. In one or more embodiments, a second data structure may be populated with one or more additional OS executables. For example, the second data structure may include a second table. In one instance, the second table may be compliant with an ACPI table. In another instance, the second table may be or include an ACPI table. In one or more embodiments, the first OS executable may install access the second data structure and install the one or more additional OS executables on a non-volatile memory medium.

In one or more embodiments, the one or more additional OS executables may enable one or more options to install the one or more additional OS executables on the IHS where existing applications of the OS may not be adequate. In one example, the one or more additional OS executables may provide one or more advantages over a single OS executable. In one instance, utilizing the one or more additional platform applications may provide a granular control over enabling and/or disabling the one or more additional applications. In another instance, utilizing the one or more additional OS executables may provide one or more options for one or more third-party vendors to provide their respective one or more OS executables without having to incorporate such functionalities into a single platform application. In another example, the one or more additional OS executables may provide persistence of the one or more additional OS executables across an installation of an OS, and/or a formatting of a non-volatile memory medium.

In one or more embodiments, during a launch of the OS, a session manager may load the platform controller and instruct the processor to execute the platform controller. In one or more embodiments, the platform controller may perform a process that loaded and executed the platform controller to load and instruct the processor to execute the one or more additional OS executables. For example, the platform controller may access the second data structure and retrieve the one or more additional OS executables. In one or more embodiments, the one or more additional OS executables may be stored via a non-volatile memory medium of the IHS. For example, the non-volatile memory medium of the IHS may include a hard disk drive, a solid state drive, etc. For instance, the one or more additional OS executables may be stored via a non-volatile memory medium of the IHS where the OS is stored.

In one or more embodiments, at least a portion of IHSFW, from a first non-volatile memory medium of an information handling system, may be executed by a processor of the information handling system. For example, before executing the at least the portion of IHSFW, an OS may be installed on a second non-volatile memory medium of the information handling system, different from the first non-volatile memory medium. In one instance, the first non-volatile memory medium may include a serial interface flash memory device. In another instance, the second memory medium may include a hard disk driver, a solid state drive, etc. In one or more embodiments, a first data structure may be registered with a second data structure. For example, the first data structure may be compliant with an ACPI table. For instance, the first data structure may be or may include an ACPI table. In one or more embodiments, the second data structure may be compliant with an ACPI table. For example, the second data structure may be or may include an ACPI table.

In one or more embodiments, a first executable that is configured to be executed by the processor may be retrieved from the first non-volatile memory medium. In one or more embodiments, the first executable may be executed by the processor via an environment associated with the IHSFW. For example, the environment associated with the IHSFW may include a driver execution environment. For instance, a first driver execution environment driver may include the first executable. In one or more embodiments, a process, configured to copy an OS executable from the first non-volatile memory medium to a third data structure stored via a volatile memory medium of the information handling system, may be registered. For example, the process may include a subroutine, and the subroutine may be registered. For instance, the subroutine may be configured to copy an OS executable from the first non-volatile memory medium to the third data structure stored via the volatile memory medium 150.

In one or more embodiments, the process may be registered with the at least the portion of the IHSFW. For example, the process may include a subroutine. For instance, the subroutine may be registered with the at least the portion of the IHSFW. In one or more embodiments, the third data structure stored via the volatile memory medium may include a table that is compliant with an ACPI table. In one or more embodiments, a second executable may be copied, by the first executable, from the first non-volatile memory medium to the volatile memory medium.

In one or more embodiments, a third executable that is configured to be executed by the processor may be retrieved from the first non-volatile memory medium. For example, the third executable may be executed by the processor via the environment associated with the IHSFW. For instance, the third executable may be executed by the processor via the driver execution environment. As an example, a second driver execution environment driver may include the third executable. In one or more embodiments, the third executable may call the process, which was registered with the at least the portion of the IHSFW. For example, the third executable may call the subroutine included by the process.

In one or more embodiments, the process may create the third data structure. For example, the subroutine included by the process may create the third data structure. In one or more embodiments, the third data structure may be registered with an ACPI service. For example, the OS may access the third data structure via the ACPI service. For instance, the OS may access the ACPI service via a management information exchange. In one or more embodiments, the third data structure may be registered with the second data structure. For example, the process may register the third data structure with the second data structure. For instance, the subroutine included by the process may register the third data structure with the second data structure.

In one or more embodiments, the process may copy the third executable from the non-volatile memory medium to the volatile memory medium. For example, the process may copy the third executable from the non-volatile memory medium to the third data structure, which may be stored via the volatile memory medium. In one or more embodiments, the OS may copy the second executable from the volatile memory medium to a second non-volatile memory medium. For example, the OS may copy the first OS executable from the first data structure of the volatile memory medium to the second non-volatile memory medium. In one or more embodiments, the OS may execute the second executable from the second non-volatile memory medium. In one or more embodiments, the second executable may include a service loader. For example, the service loader may load one or more services from the second non-volatile memory medium 160 to the OS.

In one or more embodiments, the second executable may obtain a driver. In one example, the second executable may obtain the driver from a network. For instance, the second executable may obtain the driver from a content delivery network. In another example, the second executable may obtain the driver from a component of the information handling system. In one instance, the second executable may obtain the driver from the first non-volatile memory medium. In a second instance, the second executable may obtain the driver from the second non-volatile memory medium. In another instance, the second executable may obtain the driver from a baseboard management controller.

In one or more embodiments, the second executable may utilize the driver to copy the third executable from the volatile memory medium to the second non-volatile memory medium. For example, the driver may copy the third executable from the volatile memory medium to the second non-volatile memory medium. In one or more embodiments, the second executable may utilize the driver to execute the third executable from the second non-volatile memory medium. For example, the driver may execute the third executable from the second non-volatile memory medium. In one or more embodiments, the third executable may include a service. In one example, the driver may load the service to the OS. For instance, the OS may execute the service. In another example, the driver may start the service with the OS. In one or more embodiments, the third executable may be one of the additional one or more OS executables described above. For example, others of the additional one or more OS executable may be utilized in place of the third executable. For instance, others of the additional one or more OS executable may be processed as the third executable is processed.

Turning now to FIG. 1A, examples of information handling systems are illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, Hyper-Transport (HT) bus, an inter-integrated circuit (I$^2$C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, a volatile memory medium 150, non-volatile memory media 160 and 170, an I/O subsystem 195, and a network interface 197. As illustrated, BMC 130, volatile memory medium 150, non-volatile memory media 160 and 170, I/O subsystem 195, and network interface 197 may be communicatively coupled to processor 120.

In one or more embodiments, one or more of BMC 130, volatile memory medium 150, non-volatile memory media 160 and 170, I/O subsystem 195, and network interface 197 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 195, and network interface 197 may be communicatively coupled to processor 120 via one or more PCI-Express (PCIe) root complexes. In another example, one or more of BMC 130, an I/O subsystem 195, and a network interface 197 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 197 may be utilized in communicating with one or more networks and/or one or more other information handling systems. In one example, network interface 197 may enable IHS 110 to communicate via a network utilizing a suitable transmission protocol and/or standard. In a second example, network interface 197 may be coupled to a wired network. In a third example, network interface 197 may be coupled to an optical network. In another example, network interface 197 may be coupled to a wireless network.

In one or more embodiments, network interface 197 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 197 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 195 may represent a variety of communication interfaces, graphics interfaces, video interfaces, user input interfaces, and/or peripheral interfaces, among others. For example, I/O subsystem 195 may include one or more of a touch panel and a display adapter, among others. For instance, a touch panel may include circuitry that enables touch functionality in conjunction with a display that is driven by a display adapter.

As shown, non-volatile memory medium 160 may include an OS 162, and applications (APPs) 167-169. In one or more embodiments, one or more of OS 162 and APPs 167-169 may include processor instructions executable by processor 120. In one example, processor 120 may execute processor instructions of one or more of OS 162 and APPs 167-169 via non-volatile memory medium 160. In another example, one or more portions of the processor instructions of the one or more of OS 162 and APPs 167-169 may be transferred to volatile memory medium 150, and processor 120 may execute the one or more portions of the processor instructions of the one or more of OS 162 and APPs 167-169 via volatile memory medium 150.

In one or more embodiments, OS 162 may be or include an UNIX® operating system. In one or more embodiments, OS 162 may be or include an Unix-like operating system. For instance, the Unix-like operating system may be or include LINUX®, FREEBSD®, NETBSD®, MACOS®, OpenBSD, Minix, Xinu, or Darwin, among others. In another example, OS 162 may be or include a portable operating system interface (POSIX) compliant operating system. In one or more embodiments, OS 162 may be or include a MICROSOFT® WINDOWS® operating system.

As illustrated, non-volatile memory medium 170 may include IHSFW 171. In one or more embodiments, IHSFW 171 may include processor instructions executable by processor 120. For example, IHSFW 171 may include one or more structures and/or one or more functionalities of and/or compliant with one or more of a basic input/output system (BIOS), an Extensible Firmware Interface (EFI), a Unified Extensible Firmware Interface (UEFI), and an ACPI, among others. In one instance, processor 120 may execute processor instructions of IHSFW 171 via non-volatile memory medium 170. In another instance, one or more portions of the processor instructions of IHSFW 171 may be transferred to volatile memory medium 150, and processor 120 may execute the one or more portions of the processor instructions of IHSFW 171 via volatile memory medium 150. As shown, non-volatile memory medium 170 may include IHS initialization executables 172A-172N. In one or more embodiments, IHS initialization executables 172A-172N may be executable in an environment of IHSFW 171. For example, IHS initialization executables 172A-172N may be executable in a driver execution environment (DXE) of IHSFW 171.

In one or more embodiments, an IHS initialization executable 172 may be an initializing executable. For example, an IHS initialization executable 172 may at least a portion of IHS 110. For instance, IHSFW 171 may discover and execute an IHS initialization executable 172 to initialize at least a portion of IHS 110. In one or more embodiments, an IHS initialization executable 172 may be associated with a portable execution/common object file format (PE/COFF). For example, IHSFW 171 may include a PE/COFF loader to load and execute an IHS initialization executable 172. In one or more embodiments, an IHS initialization executable 172 may be a DXE driver. For example, IHSFW 171 may include a DXE dispatcher that may discover and execute an IHS initialization executable 172 to initialize at least a portion of IHS 110.

As illustrated, non-volatile memory medium 170 may include OS executables 174A-174N. In one or more embodiments, OS executables 174A-174N may be executable in an environment of OS 162. For example, one or more of OS executables 174A-174N may be platform applications.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, multiple information handling systems may be communicatively coupled to a network. For example, information handling systems (IHSs) 110A-110B may be communicatively coupled to a network 105. In one instance, a first information handling system of IHSs 110A-110B may receive data from a second information handling system of IHSs 110A-110B via network 105. In another instance, the second information handling system may provide the data to the first information handling system via network 105.

In one or more embodiments, network 105 may include a wired network, a wireless network, an optical network, or a combination of the foregoing, among others. For example, network 105 may include and/or be coupled to various types of communications networks. For instance, network 105 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

Figure 1B:
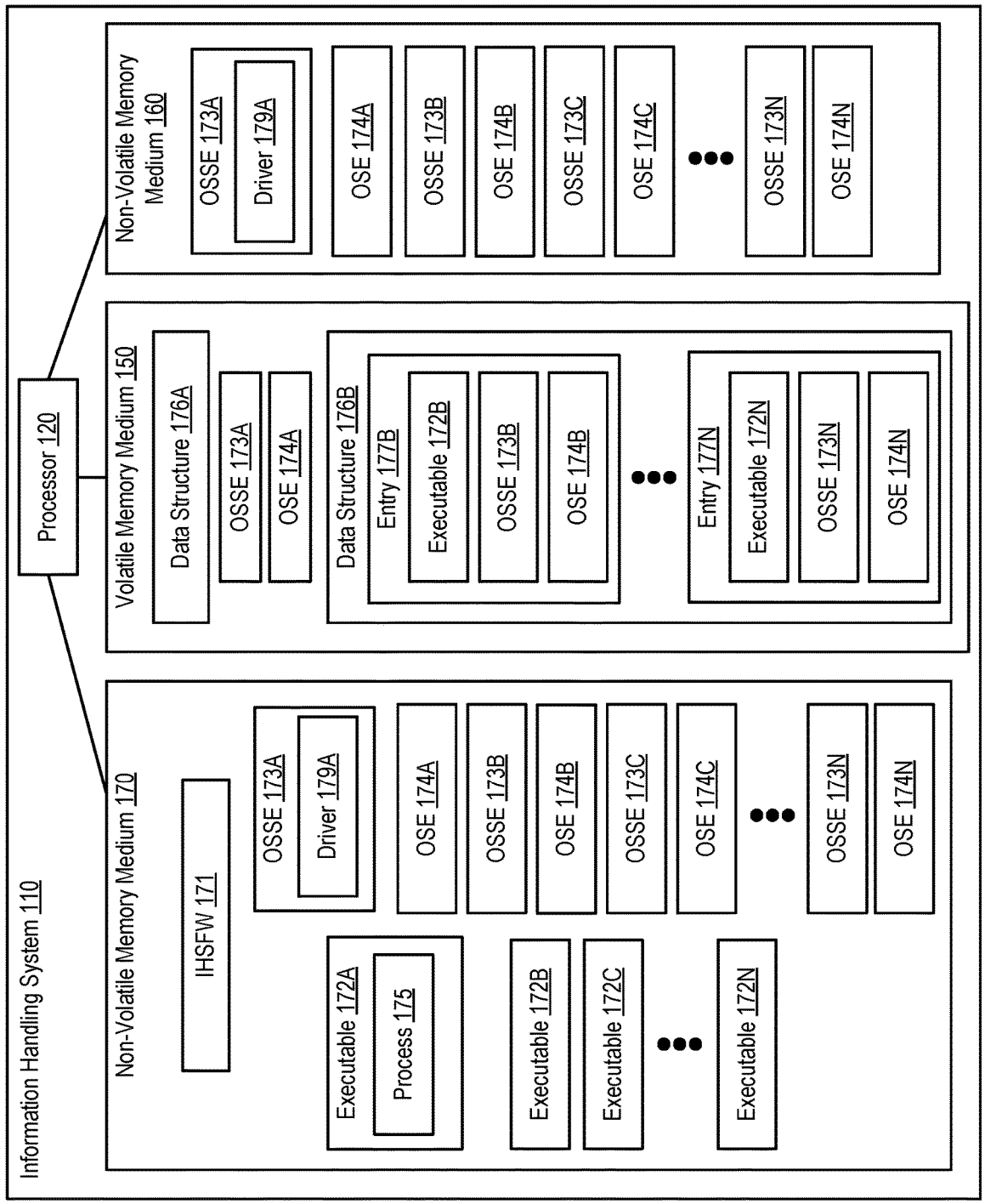
FIG. 1B illustrates an example of an information handling system, according to one or more embodiments.

Turning now to FIG. 1B, an example of an information handling system is illustrated, according to one or more embodiments. In one or more embodiments, IHS initialization executable 172A may be executed. For example, IHS initialization executable 172A may be executed via at least a portion of IHSFW 171. For instance, the at least the portion of IHSFW 171 may determine that non-volatile memory medium 170 includes IHS initialization executable 172A and may instruct processor 120 to execute IHS initialization executable 172A. In one or more embodiments, IHSFW 171 may include and/or may provide an environment. For example, IHSFW 171 may include and/or may provide a DXE. In one or more embodiments, an IHS initialization executable 172 may be or may include a DXE driver. For example, the DXE driver may be executed in a DXE. For instance, processor 120 may execute the DXE driver via the DXE and/or may execute the DXE driver within the DXE. In one or more embodiments, a DXE driver may typically be associated with a hardware component of IHS 110. For example, the DXE driver may enable IHSFW 171 to communicate with the hardware component. In one or more embodiments, a DXE driver may not be associated with a hardware component of IHS 110. For example, an IHS initialization executable 172 may be a DXE driver but may not be associated with a hardware component of IHS 110. For instance, an executable 172 may permit instructions of processor 120 to execute via the DXE.

In one or more embodiments, IHS initialization executable 172A may include a process 175. In one or more embodiments, process 175 may include instructions, executable by processor 120, to implement at least a portion of one or more systems, at least a portion of one or more flowcharts, at least a portion of one or more methods, and/or at least a portion of one or more processes described herein. For example, processor 120 may execute processor instructions of process 175 in implementing at least a portion of one or more systems, at least a portion of one or more flowcharts, at least a portion of one or more methods, and/or at least a portion of one or more processes described herein. In one or more embodiments, process 175 may include a subroutine. For example, the subroutine included by process 175 may include instructions, executable by processor 120, to implement at least a portion of one or more systems, at least a portion of one or more flowcharts, at least a portion of one or more methods, and/or at least a portion of one or more processes described herein. For instance, processor 120 may execute processor instructions of the subroutine, included by process 175, in implementing at least a portion of one or more systems, at least a portion of one or more flowcharts, at least a portion of one or more methods, and/or at least a portion of one or more processes described herein.

In one or more embodiments, process 175 may be registered with at least a portion of IHSFW 171. For example, executing IHS initialization executable 172A may register process 175 with at least a portion of IHSFW 171. In one or more embodiments, the subroutine included by process 175 may be registered with at least a portion of IHSFW 171. For example, executing IHS initialization executable 172A may register the subroutine, included by process 175, with at least a portion of IHSFW 171. In one or more embodiments, one or more of IHS initialization 172B-172N may call process 175. For example, the one or more of IHS initialization executables 172B-172N may call process 175 after process 175 is registered. For instance, the one or more of executables 172B-172N may instruct processor 120 to execute process 175. In one or more embodiments, one or more of IHS initialization 172B-172N may call the subroutine included by process 175. For example, the one or more of IHS initialization executables 172B-172N may call the subroutine, included by process 175, after the subroutine included by process 175 is registered. For instance, the one or more of executables 172B-172N may instruct processor 120 to execute the subroutine included by process 175.

In one or more embodiments, a data structure 176A may be created in volatile memory medium 150. For example, executing IHS initialization executable 172A may create data structure 176A in volatile memory medium 150. In one or more embodiments, data structure 176A may be compliant with an ACPI table. In one or more embodiments, data structure 176A may include an ACPI table. In one or more embodiments, OS executable (OSE) 174A may be copied from non-volatile memory medium 170 to volatile memory medium 150. For example, IHS initialization executable 172A may copy OSE 174A from non-volatile memory medium 170 to volatile memory medium 150. In one instance, copying OSE 174A from non-volatile memory medium 170 to volatile memory medium 150 may include retrieving OSE 174A from non-volatile memory medium 170. In another instance, copying OSE 174A from non-volatile memory medium 170 to volatile memory medium 150 may include writing OSE 174A to volatile memory medium 150.

In one or more embodiments, IHS initialization executable 172B may be executed. For example, IHS initialization executable 172B may be executed via at least a portion of IHSFW 171. For instance, the at least the portion of IHSFW 171 may determine that non-volatile memory medium 170 includes IHS initialization executable 172B and may instruct processor 120 to execute IHS initialization executable 172B. In one or more embodiments, IHS initialization executable 172B may call process 175. For example, IHS initialization executable 172B may instruct processor 120 to execute process 175. In one or more embodiments, IHS initialization executable 172B may call the subroutine included by process 175. For example, IHS initialization executable 172B may instruct processor 120 to execute the subroutine included by process 175.

In one or more embodiments, a data structure 176B may be created in volatile memory medium 150. In one example, process 175 may create data structure 176B in volatile memory medium 150. In one instance, process 175 may create data structure 176B in volatile memory medium 150 in response to being called by IHS initialization executable 172B. In another instance, process 175 may create data structure 176B in volatile memory medium 150 in response to determining that data structure 176B does not exist in volatile memory medium 150. In another example, the subroutine, included by process 175, may create data structure 176B in volatile memory medium 150. In one instance, the subroutine, included by process 175, may create data structure 176B in volatile memory medium 150 in response to being called by IHS initialization executable 172B. In another instance, the subroutine, included by process 175, may create data structure 176B in volatile memory medium 150 in response to determining that data structure 176B does not exist in volatile memory medium 150. In one or more embodiments, data structure 176B may be compliant with an ACPI table. In one or more embodiments, data structure 176B may be or may include an ACPI table.

In one or more embodiments, an operating system setup executable (OSSE) 173B may be copied from non-volatile memory medium 170 to volatile memory medium 150. For example, IHS initialization executable 172B may copy OSSE 173B from non-volatile memory medium 170 to volatile memory medium 150. In one instance, copying OSSE 173B from non-volatile memory medium 170 to volatile memory medium 150 may include retrieving OSSE 173B from non-volatile memory medium 170. In another instance, copying OSSE 173B from non-volatile memory medium 170 to volatile memory medium 150 may include writing OSSE 173B to volatile memory medium 150. In one or more embodiments, an OSSE 173 may be or may include a platform binary. For example, an OSSE 173 may set up an OSE 174 with OS 162. For instance, an OSE 174 may include a service. As an example, OSSE 173 may set up OSE 174 with at least a portion of OS 162 that manages one or more operating system executables (OSEs) 174.

In one or more embodiments, OSE 174B may be copied from non-volatile memory medium 170 to volatile memory medium 150. For example, IHS initialization executable 172B may copy OSE 174B from non-volatile memory medium 170 to volatile memory medium 150. In one instance, copying OSE 174B from non-volatile memory medium 170 to volatile memory medium 150 may include retrieving OSE 174B from non-volatile memory medium 170. In another instance, copying OSE 174B from non-volatile memory medium 170 to volatile memory medium 150 may include writing OSE 174B to volatile memory medium 150.

In one or more embodiments, one or more methods and/or one or more processes described above with reference to OSSE 173B and/or OSE 174B may be respectively utilized with operating system setup executables (OSSes) 173C-173N and/or OSEs 174C-174N. In one example, OSSes 173C-173N may be copied from non-volatile memory medium 170 to volatile memory medium 150. For instance, one or more of IHS initialization executables 172C-172N may be executed and may respectively copy one or more of OSSes 173C-173N from non-volatile memory medium 170 to volatile memory medium 150. In another example, OSEs 174C-174N may be copied from non-volatile memory medium 170 to volatile memory medium 150. For instance, one or more of IHS initialization executables 172C-172N may be executed and may respectively copy one or more of OSEs 174C-174N from non-volatile memory medium 170 to volatile memory medium 150. In one or more embodiments, data structure 176B may store one or more of OSSes 173B-173N and/or one or more of OSEs 174B-174N.

In one or more embodiments, OSE 174A may be copied from volatile memory medium 150 to non-volatile memory medium 160. For example, OS 162 may copy OSE 174A from volatile memory medium 150 to non-volatile memory medium 160. In one instance, copying OSE 174A from volatile memory medium 150 to non-volatile memory medium 160 may include retrieving OSE 174A from volatile memory medium 150. In another instance, copying OSE 174A from volatile memory medium 150 to non-volatile memory medium 160 may include writing OSE 174A to non-volatile memory medium 160. In one or more embodiments, OS 162 may include a MICROSOFT® WINDOWS® operating system. For example, a MICROSOFT® WINDOWS® operating system session manager may copy OSE 174A from volatile memory medium 150 to non-volatile memory medium 160. For instance, the MICROSOFT® WINDOWS® operating system session manager may be executed via a startup process of the MICROSOFT® WINDOWS® operating system. In one or more embodiments, OS 162 may launch OSE 174A. For example, launching OSE 174A may include instructing processor 120 to execute OSE 174A. For instance, the MICROSOFT® WINDOWS® operating system session manager may instruct processor 120 to execute OSE 174A. In one or more embodiments, OSE 174A may be or may include a platform controller.

In one or more embodiments, OSE 174A may determine that data structure 176B exists in volatile memory medium 150. For example, OSE 174A may access data structure 176B. For instance, OSE 174A may access entries 177 of data structure 176B. As an example, OSE 174A may access entry 177B of data structure 176B to access OSSE 173B. As another example, OSE 174A may access entry 177B of data structure 176B to access OSE 174B. In one or more embodiments, OSE 174A may copy OSSE 173B from volatile memory medium 150 to non-volatile memory medium 160. In one example, copying OSSE 173B from volatile memory medium 150 to non-volatile memory medium 160 may include retrieving OSSE 173B from volatile memory medium 150. In another example, copying OSSE 173B from volatile memory medium 150 to non-volatile memory medium 160 may include writing OSSE 173B to non-volatile memory medium 160. In one or more embodiments, OSE 174A may copy OSE 174B from volatile memory medium 150 to non-volatile memory medium 160. In one example, copying OSE 174B from volatile memory medium 150 to non-volatile memory medium 160 may include retrieving OSE 174B from volatile memory medium 150. In another example, copying OSE 174B from volatile memory medium 150 to non-volatile memory medium 160 may include writing OSE 174B to non-volatile memory medium 160.

In one or more embodiments, one or more methods and/or one or more processes described above with reference to OSSE 173B and/or OSE 174B may be respectively utilized with OSSEs 173C-173N and/or OSEs 174C-174N. In one example, OSSEs 173C-173N may be copied from volatile memory medium 150 to volatile non-memory medium 160. For instance, OSE 174A may copy one or more of OSSEs 173C-173N from volatile memory medium 150 to volatile non-memory medium 160. In another example, OSEs 174C-174N may be copied from volatile memory medium 150 to volatile non-memory medium 160. For instance, OSE174A may copy one or more of OS executables 174C-174N from volatile memory medium 150 to volatile non-memory medium 160.

In one or more embodiments, data structure 176B may store entries 177B-177N respectively associated with OSSEs 173B-173N and/or OSEs 174B-174N. For example, entries 177B-177N may respectively store OSSEs 173B-173N and/or OSEs 174B-174N. For instance, when data structure 176B is or includes a table or includes a table, entries 177B-177N may be or may include rows of the table, which may respectively store OSSEs 173B-173N and/or OSEs 174B-174N.

In one or more embodiments, volatile memory medium 150 may be associated with multiple portions. For example, volatile memory medium 150 may be associated with multiple memory portions 152A-152C, as illustrated in FIG. 1E. For instance, a memory portion 152 may be associated with an address range. As an example, memory portions 152A-152C may be respectively associated with different address ranges. Although three memory portions are illustrated in FIG. 1E, any number of memory portions may be utilized, according to one or more embodiments. In one or more embodiments, memory portion 152A may be associated with an address range that is accessible by IHSFW 171 and/or OS 162. For example, memory portion 152A may be associated with an address range that is accessible by a kernel of OS 162. In one instance, the address range associated with memory portion 152A may be accessed in a privileged mode. In another instance, the address range associated with memory portion 152A may not be accessible by a user space application and/or may not be accessible by instructions that are executed via user space.

In one or more embodiments, OS executable 174A may include a driver 179A. For example, driver 179A may access memory portion 152A. In one instance, driver 179A may access a kernel of OS 162, which may access memory portion 152A. In another instance, driver 179A may include a loadable kernel module for a kernel of OS 162, which may access memory portion 152A. As an example, memory portion 152A may be accessible by a kernel of OS 162 and/or a loadable kernel module for the kernel of OS 162. For instance, memory portion 152A may be associated with kernel space, and memory portion 152B may be associated with user space. In one or more embodiments, driver 179A may enable OS executable 174A to access memory portion 152A (e.g., kernel space). For example, driver 179A may be executed in a privileged mode, which access memory portion 152A. For instance, driver 179A may be executed in a privileged mode, which may be permitted to access memory portion 152A.

In one or more embodiments, OS 162 may instruct processor 120 to execute one or more of OSSEs 173B-173N. In one example, after OS 162 finishes a startup portion of OS 162, OS 162 may instruct processor 120 to execute one or more of OSSEs 173B-173N. In another example, after OS 162 finishes the startup portion of OS 162, OS 162 may not instruct processor 120 to execute other one or more of OSSEs 173B-173N. For instance, a user, a service, or an application (e.g., an application of APPs 167-169) may launch (e.g., start) the other one or more of OSSEs 173B-173N. As an example, the other one or more of OSSEs 173B-173N may include one or more applications. For instance, an executable of the other one or more of OSSEs 173B-173N may include an application that includes one or more structures and/or one or more functionalities of an application of APPs 167-169. In one or more embodiments, OSSEs 173B-173N, when executed, may respectively set up OSEs 174B-174N. In one example, OSSEs 173B-173N may configure one or more portions of OS 162 to respectively set up OSEs 174B-174N. In another example, OSSEs 173B-

173N may configure one or more configuration files utilized by OS 162 to respectively set up OSEs 174B-174N.

In one or more embodiments, utilizing one or more systems, one or more methods, and/or one or more processes described herein, one or more of OSSEs 173B-173N and/or OSEs 174B-174N may have continuity across formatting non-volatile memory medium 160 and/or across installations of one or more operating systems on non-volatile memory medium 160. For example, one or more of OSSEs 173B-173N and/or one or more of OSEs 174B-174N may endure and/or may persist across formatting non-volatile memory medium 160. For instance, one or more of OSSEs 173B-173N and/or one or more of OSEs 174B-174N may be reinstalled after formatting non-volatile memory medium 160. In one or more embodiments, utilizing one or more systems, one or more methods, and/or one or more processes described herein, one or more of OSSEs 173B-173N and/or one or more of OSEs 174B-174N may have continuity and/or may persist across another installation of an operating system. For example, one or more of OSSEs 173B-173N and/or one or more of OSEs 174B-174N may endure and/or may persist across another installation of an operating system. For instance, one or more of OSSEs 173B-173N and/or one or more of OSEs 174B-174N may be reinstalled after another installation of an operating system.

Figure 1C:
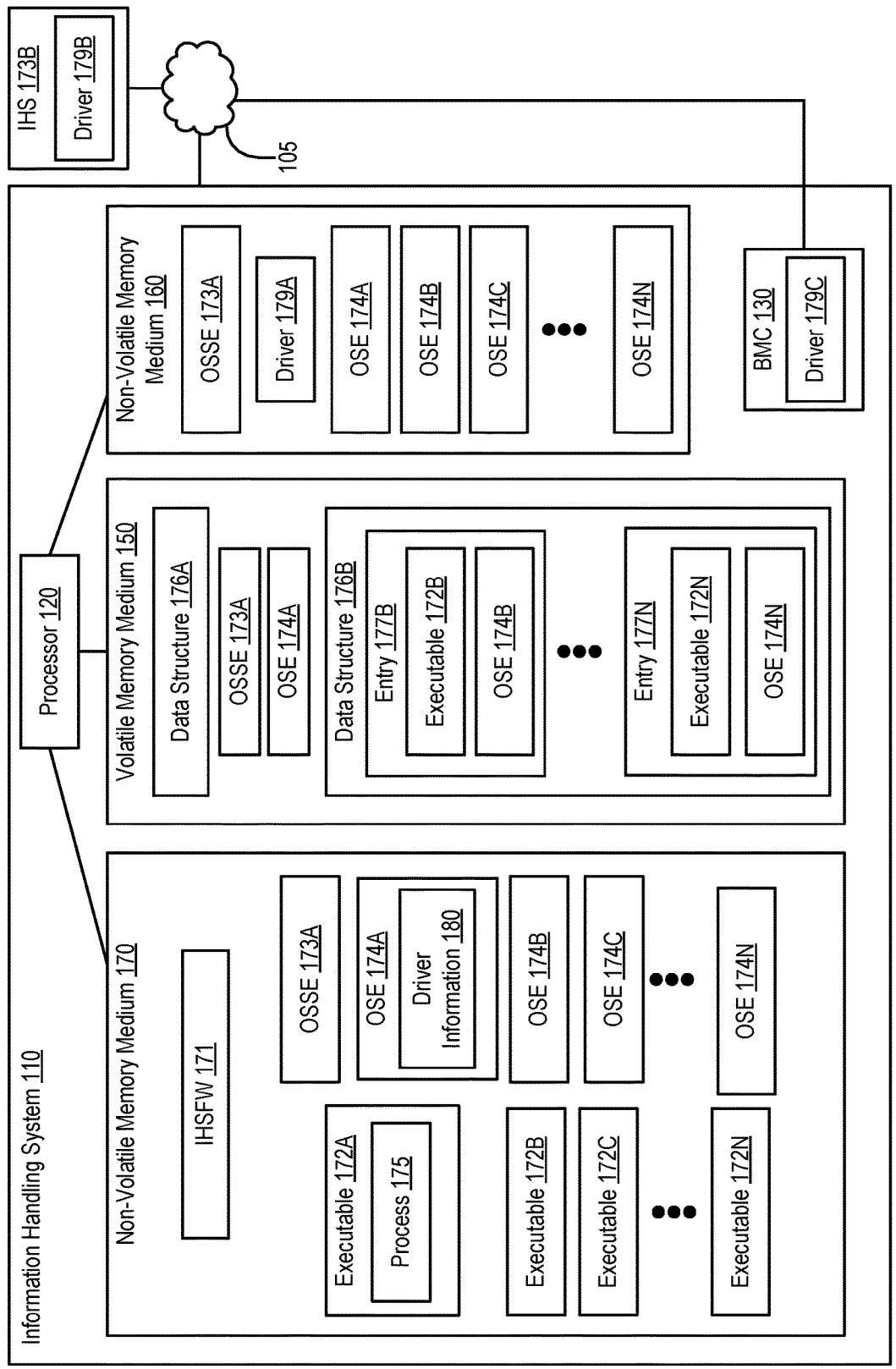
FIG. 1C illustrates a second example of an information handling system, according to one or more embodiments.

Turning now to FIG. 1C, a second example of an information handling system is illustrated, according to one or more embodiments. In one or more embodiments, IHS initialization executable 172A may be executed. For example, IHS initialization executable 172A may be executed via at least a portion of IHSFW 171. For instance, the at least the portion of IHSFW 171 may determine that non-volatile memory medium 170 includes IHS initialization executable 172A and may instruct processor 120 to execute IHS initialization executable 172A. In one or more embodiments, IHSFW 171 may include and/or may provide an environment. For example, IHSFW 171 may include and/or may provide a DXE. In one or more embodiments, an IHS initialization executable 172 may be or may include a DXE driver. For example, the DXE driver may be executed in a DXE. For instance, processor 120 may execute the DXE driver via the DXE and/or may execute the DXE driver within the DXE. In one or more embodiments, a DXE driver may typically be associated with a hardware component of IHS 110. For example, the DXE driver may enable IHSFW 171 to communicate with the hardware component. In one or more embodiments, a DXE driver may not be associated with a hardware component of IHS 110. For example, an IHS initialization executable 172 may be a DXE driver but may not be associated with a hardware component of IHS 110. For instance, an executable 172 may permit instructions of processor 120 to execute via the DXE.

In one or more embodiments, IHS initialization executable 172A may include a process 175. In one or more embodiments, process 175 may include instructions, executable by processor 120, to implement at least a portion of one or more systems, at least a portion of one or more flowcharts, at least a portion of one or more methods, and/or at least a portion of one or more processes described herein. For example, processor 120 may execute processor instructions of process 175 in implementing at least a portion of one or more systems, at least a portion of one or more flowcharts, at least a portion of one or more methods, and/or at least a portion of one or more processes described herein. In one or more embodiments, process 175 may include a subroutine. For example, the subroutine, included by process 175, may include instructions, executable by processor 120, to implement at least a portion of one or more systems, at least a portion of one or more flowcharts, at least a portion of one or more methods, and/or at least a portion of one or more processes described herein. For instance, processor 120 may execute processor instructions of the subroutine, included by process 175, in implementing at least a portion of one or more systems, at least a portion of one or more flowcharts, at least a portion of one or more methods, and/or at least a portion of one or more processes described herein.

In one or more embodiments, process 175 may be registered with at least a portion of IHSFW 171. For example, executing IHS initialization executable 172A may register process 175 with at least a portion of IHSFW 171. In one or more embodiments, the subroutine, included by process 175, may be registered with at least a portion of IHSFW 171. For example, executing IHS initialization executable 172A may register the subroutine, included by process 175, with at least a portion of IHSFW 171. In one or more embodiments, one or more of IHS initialization 172B-172N may call process 175. For example, the one or more of IHS initialization executables 172B-172N may call process 175 after process 175 is registered. For instance, the one or more of executables 172B-172N may instruct processor 120 to execute process 175. In one or more embodiments, one or more of IHS initialization 172B-172N may call the subroutine included by process 175. For example, the one or more of IHS initialization executables 172B-172N may call the subroutine, included by process 175, after the subroutine, included by process 175, is registered. For instance, the one or more of executables 172B-172N may instruct processor 120 to execute the subroutine included by process 175.

In one or more embodiments, a data structure 176A may be created in volatile memory medium 150. For example, executing IHS initialization executable 172A may create data structure 176A in volatile memory medium 150. In one or more embodiments, data structure 176A may be compliant with an ACPI table. In one or more embodiments, data structure 176A may include an ACPI table. In one or more embodiments, OSE 174A may be copied from non-volatile memory medium 170 to volatile memory medium 150. In one example, IHS initialization executable 172A may copy OSE 174A from non-volatile memory medium 170 to volatile memory medium 150. In one instance, copying OSE 174A from non-volatile memory medium 170 to volatile memory medium 150 may include retrieving OSE 174A from non-volatile memory medium 170. In another instance, copying OSE 174A from non-volatile memory medium 170 to volatile memory medium 150 may include writing OSE 174A to volatile memory medium 150. In one example, IHS initialization executable 172A may copy OSE 174A from non-volatile memory medium 170 to data structure 176A. In one instance, copying OSE 174A from non-volatile memory medium 170 to data structure 176A may include retrieving OSE 174A from non-volatile memory medium 170. In another instance, copying OSE 174A from non-volatile memory medium 170 to data structure 176A may include writing OSE 174A to data structure 176A.

In one or more embodiments, IHS initialization executable 172B may be executed. For example, IHS initialization executable 172B may be executed via at least a portion of IHSFW 171. For instance, the at least the portion of IHSFW 171 may determine that non-volatile memory medium 170 includes IHS initialization executable 172B and may instruct processor 120 to execute IHS initialization executable 172B. In one or more embodiments, IHS initialization executable 172B may call process 175. For example, IHS initialization executable 172B may instruct processor 120 to execute process 175. In one or more embodiments, IHS initialization executable 172B may call the subroutine included by process 175. For example, IHS initialization executable 172B may instruct processor 120 to execute the subroutine included by process 175.

In one or more embodiments, a data structure 176B may be created in volatile memory medium 150. In one example, process 175 may create data structure 176B in volatile memory medium 150. In one instance, process 175 may create data structure 176B in volatile memory medium 150 in response to being called by IHS initialization executable 172B. In another instance, process 175 may create data structure 176B in volatile memory medium 150 in response to determining that data structure 176B does not exist in volatile memory medium 150. In another example, the subroutine, included by process 175, may create data structure 176B in volatile memory medium 150. In one instance, the subroutine, included by process 175, may create data structure 176B in volatile memory medium 150 in response to being called by IHS initialization executable 172B. In another instance, the subroutine, included by process 175, may create data structure 176B in volatile memory medium 150 in response to determining that data structure 176B does not exist in volatile memory medium 150. In one or more embodiments, data structure 176B may be compliant with an ACPI table. In one or more embodiments, data structure 176B may be or may include an ACPI table.

In one or more embodiments, OSSE 173B may not be present. For example, non-volatile memory medium 170 may not include OSSE 173B. For instance, non-volatile memory medium 170 may not include a platform binary for OSE 174B. As an example, an OSE 174 may include a service. In one or more embodiments, OSE 174B may be copied from non-volatile memory medium 170 to volatile memory medium 150. In one example, IHS initialization executable 172B may copy OSE 174B from non-volatile memory medium 170 to volatile memory medium 150. In one instance, copying OSE 174B from non-volatile memory medium 170 to volatile memory medium 150 may include retrieving OSE 174B from non-volatile memory medium 170. In another instance, copying OSE 174B from non-volatile memory medium 170 to volatile memory medium 150 may include writing OSE 174B to volatile memory medium 150. In a second example, process 175 may copy OSE 174B from non-volatile memory medium 170 to volatile memory medium 150. In one instance, copying OSE 174B from non-volatile memory medium 170 to volatile memory medium 150 may include retrieving OSE 174B from non-volatile memory medium 170. In another instance, copying OSE 174B from non-volatile memory medium 170 to volatile memory medium 150 may include writing OSE 174B to volatile memory medium 150. In another example, process 175 may copy OSE 174B from non-volatile memory medium 170 to data structure 176B. In one instance, copying OSE 174B from non-volatile memory medium 170 to data structure 176B may include retrieving OSE 174B from non-volatile memory medium 170. In another instance, copying OSE 174B from non-volatile memory medium 170 to data structure 176B may include writing OSE 174B to data structure 176B.

In one or more embodiments, one or more methods and/or one or more processes described above with reference to OSE 174B may be utilized with OSEs 174C-174N. For example, OSEs 174C-174N may be copied from non-volatile memory medium 170 to volatile memory medium 150. For instance, one or more of IHS initialization executables 172C-172N may be executed and may respectively copy one or more of OSEs 174C-174N from non-volatile memory medium 170 to volatile memory medium 150. In one or more embodiments, data structure 176B may store one or more of OSEs 174C-174N.

In one or more embodiments, OSE 174A may be copied from volatile memory medium 150 to non-volatile memory medium 160. In one example, OS 162 may copy OSE 174A from volatile memory medium 150 to non-volatile memory medium 160. In one instance, copying OSE 174A from volatile memory medium 150 to non-volatile memory medium 160 may include retrieving OSE 174A from volatile memory medium 150. In another instance, copying OSE 174A from volatile memory medium 150 to non-volatile memory medium 160 may include writing OSE 174A to non-volatile memory medium 160. In another example, OS 162 may copy OSE 174A from data structure 176A to non-volatile memory medium 160. In one instance, copying OSE 174A from data structure 176A to non-volatile memory medium 160 may include retrieving OSE 174A from data structure 176A. In another instance, copying OSE 174A from data structure 176A to non-volatile memory medium 160 may include writing OSE 174A to non-volatile memory medium 160.

In one or more embodiments, OS 162 may include a MICROSOFT® WINDOWS® operating system. In one example, a MICROSOFT® WINDOWS® operating system session manager may copy OSE 174A from volatile memory medium 150 to non-volatile memory medium 160. For instance, the MICROSOFT® WINDOWS® operating system session manager may be executed via a startup process of the MICROSOFT® WINDOWS® operating system. In another example, a MICROSOFT® WINDOWS® operating system session manager may copy OSE 174A from data structure 176A to non-volatile memory medium 160. For instance, the MICROSOFT® WINDOWS® operating system session manager may be executed via a startup process of the MICROSOFT® WINDOWS® operating system. In one or more embodiments, OS 162 may launch OSE 174A. For example, launching OSE 174A may include instructing processor 120 to execute OSE 174A. For instance, the MICROSOFT® WINDOWS® operating system session manager may instruct processor 120 to execute OSE 174A. In one or more embodiments, OSE 174A may be or may include a platform controller.

In one or more embodiments, OSE 174A may determine that data structure 176B exists in volatile memory medium 150. For example, OSE 174A may access data structure 176B. For instance, OSE 174A may access entries 177 of data structure 176B. For example, OSE 174A may access entry 177B of data structure 176B to access OSE 174B. In one or more embodiments, OSE 174A may copy OSE 174B from volatile memory medium 150 to non-volatile memory medium 160. In one example, copying OSE 174B from volatile memory medium 150 to non-volatile memory medium 160 may include retrieving OSE 174B from volatile memory medium 150. In a second example, copying OSE 174B from volatile memory medium 150 to non-volatile memory medium 160 may include writing OSE 174B to non-volatile memory medium 160. In a third example, copying OSE 174B from volatile memory medium 150 to non-volatile memory medium 160 may include retrieving OSE 174B from data structure 176B. In another example, copying OSE 174B from data structure 176B to non-volatile memory medium 160 may include writing OSE 174B to non-volatile memory medium 160.

In one or more embodiments, one or more methods and/or one or more processes described above with reference to OSE 174B may be utilized with OSEs 174C-174N. For example, OSEs 174C-174N may be copied from volatile memory medium 150 to volatile non-memory medium 160. For instance, OSE174A may copy one or more of OSEs 174C-174N from volatile memory medium 150 to volatile non-memory medium 160. In one or more embodiments, data structure 176B may store entries 177B-177N respectively associated with OSEs 174B-174N. For example, entries 177B-177N may respectively store OSEs 174B-174N. For instance, when data structure 176B is a table or includes a table, entries 177B-177N may be or may include rows of the table, which may respectively store OSEs 174B-174N.

Figure 1D:
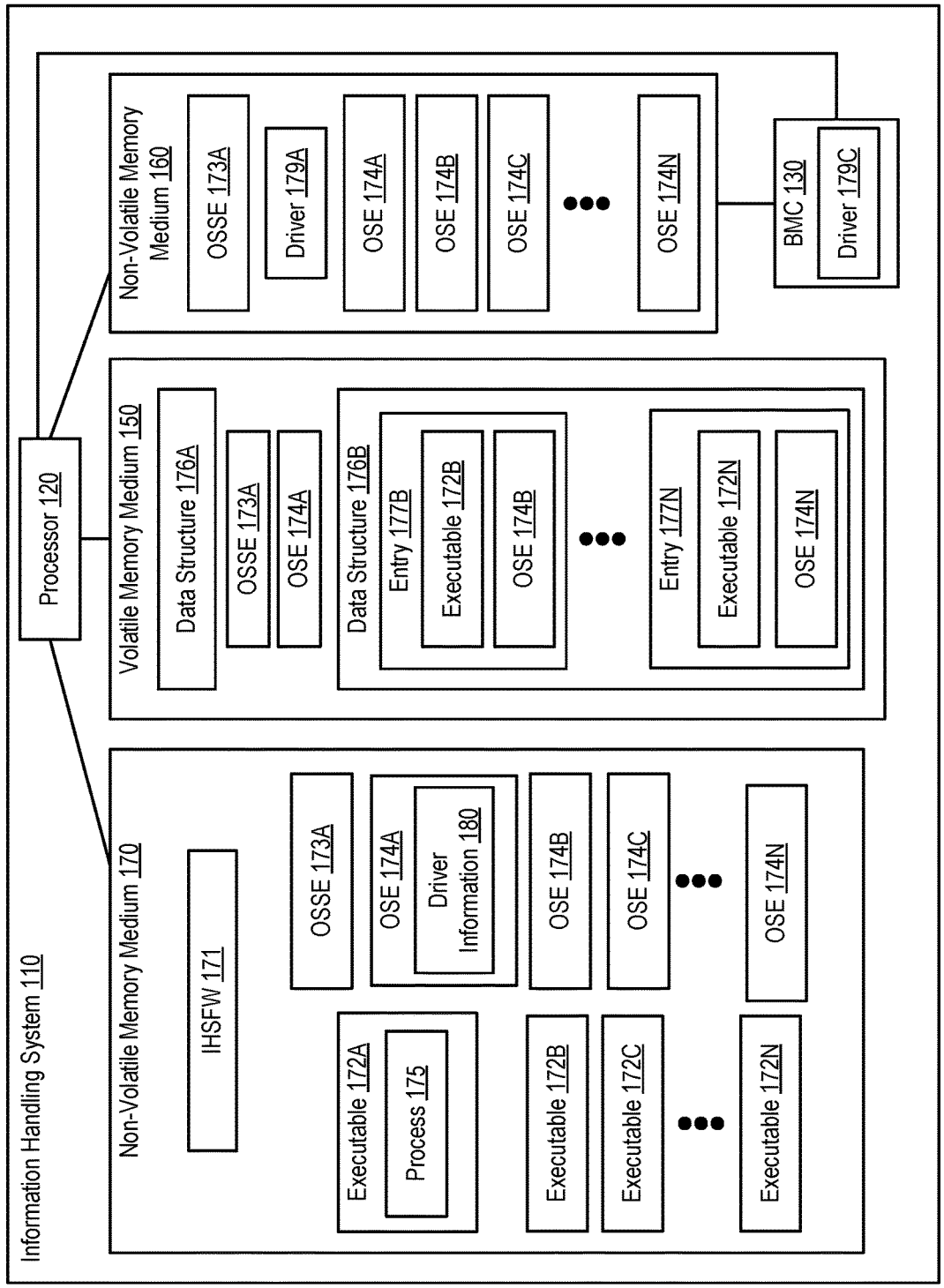
FIG. 1D illustrates a third example of an information handling system, according to one or more embodiments.
Figure 1E:
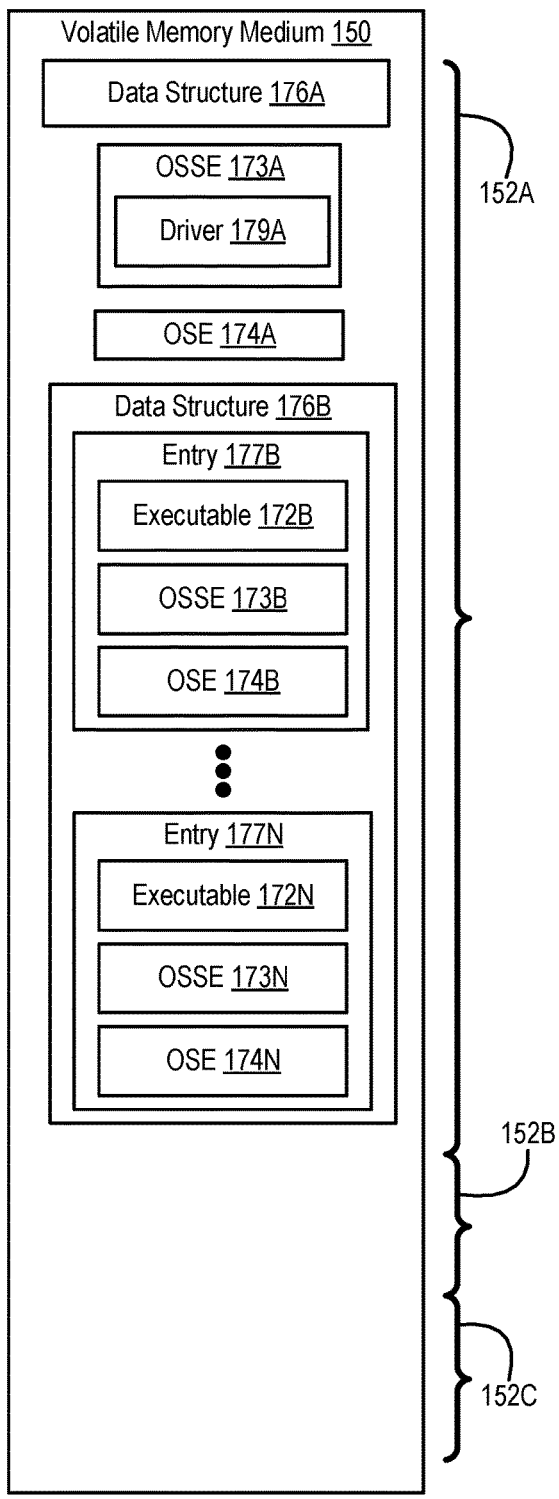
FIG. 1E illustrates an example of multiple portions of a volatile memory medium, according to one or more embodiments.
Figure 1F:
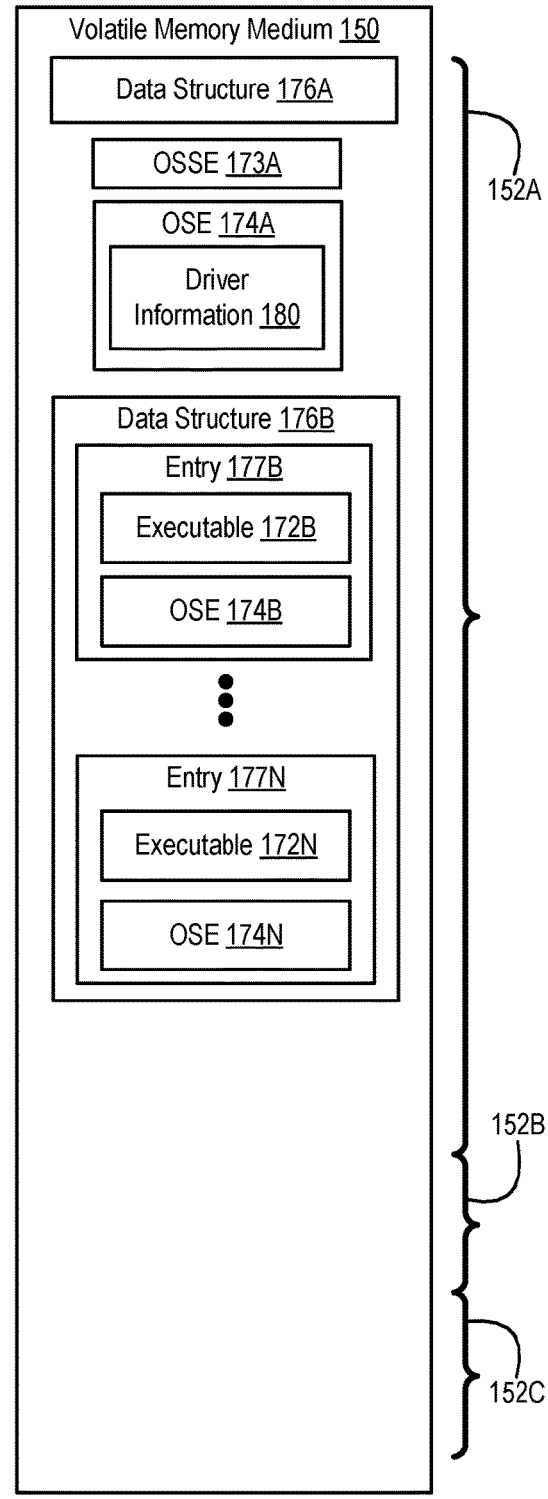
FIG. 1F illustrates another example of multiple portions of a volatile memory medium, according to one or more embodiments.

In one or more embodiments, volatile memory medium 150 may be associated with multiple portions. For example, volatile memory medium 150 may be associated with multiple memory portions 152A-152C, as illustrated in FIG. 1F. For instance, a memory portion 152 may be associated with an address range. As an example, memory portions 152A-152C may be respectively associated with different address ranges. Although three memory portions are illustrated in FIG. 1F, any number of memory portions may be utilized, according to one or more embodiments. In one or more embodiments, memory portion 152A may be associated with an address range that is accessible by IHSFW 171 and/or OS 162. For example, memory portion 152A may be associated with an address range that is accessible by a kernel of OS 162. In one instance, the address range associated with memory portion 152A may be accessed in a privileged mode. In another instance, the address range associated with memory portion 152A may not be accessible by a user space application and/or may not be accessible by instructions that are executed via user space.

In one or more embodiments, a driver 179A may be obtained. For example, OSSE 173A may include driver information 180. For instance, driver information 180 may include information on how and/or where to obtain driver 179A. For instance, driver information 180 may include one or more of a network address (e.g., an IP address, a media access control (MAC) address, etc.), an uniform resource locator (URL), an uniform resource identifier (URI), a memory address, a bus address, a host name (e.g., drivers-.dell.com, www.driver.dell.com, etc.), a port number, a communication protocol identification, a file path, a user name, a password, a hash value, a client identification, an encryption key, and an authentication key, among others.

In one or more embodiments, driver 179A may be stored via one or more of non-volatile memory media 160 and 170, among others. For example, after driver 179A is stored via one or more of non-volatile memory media 160 and 170, among others, driver 179A may be retrieved from one of non-volatile memory media 160 and 170, among others. For instance, after driver 179A is retrieved from one of non-volatile memory media 160 and 170, among others, driver 179A may be utilized.

In one or more embodiments, driver 179A may be obtained from IHS 110B. For example, driver 179B may be obtained from IHS 110B via network 105. For instance, IHS 110 may be communicatively coupled to network 105. As an example, driver 179B may be obtained from IHS 110B based at least on driver information 180. In one or more embodiments, driver 179B may be obtained from IHS 110B and may be stored as driver 179A. In one or more embodiments, driver 179B may be obtained from BMC 130. In one example, driver 179B may be obtained from BMC 130 via network 105. For instance, IHS 110 and BMC 130 may be communicatively coupled to network 105. In a second example, BMC 130 may be communicatively coupled to volatile memory medium 150, as illustrated in FIG. 1D. For instance, BMC 130 may provide driver 179C to volatile memory medium 150 as driver 179A. In another example, BMC 130 may be communicatively coupled to processor 120, as shown in FIG. 1D. For instance, processor 120 may obtain driver 179C from BMC 130 and may store driver 179C as driver 179A. As an example, processor 120 may obtain driver 179C from BMC 130 and may store driver 179C as driver 179A via volatile memory medium 150. In one or more embodiments, driver 179C may be obtained from BMC 130 based at least on driver information 180.

In one or more embodiments, driver 179A may access memory portion 152A. In one example, driver 179A may access a kernel of OS 162, which may access memory portion 152A. In another example, driver 179A may include a loadable kernel module for a kernel of OS 162, which may access memory portion 152A. In one or more embodiments, memory portion 152A may be accessible by a kernel of OS 162 and/or by a loadable kernel module for the kernel of OS 162. For example, memory portion 152A may be associated with kernel space, and memory portion 152B may be associated with user space. For instance, driver 179A may enable OS executable 174A to access memory portion 152A (e.g., kernel space). As an example, driver 179A may be executed in a privileged mode, which may access memory portion 152A.

In one or more embodiments, utilizing one or more systems, one or more methods, and/or one or more processes described herein, one or more of OSEs 174B-174N may have continuity and/or persistence across formatting non-volatile memory medium 160 and/or across installations of one or more operating systems on non-volatile memory medium 160. For example, one or more of OSEs 174B-174N may endure and/or may persist across formatting non-volatile memory medium 160. For instance, one or more of OSEs 174B-174N may be reinstalled after formatting non-volatile memory medium 160. In one or more embodiments, utilizing one or more systems, one or more methods, and/or one or more processes described herein, one or more of OSEs 174B-174N may have continuity and/or may persist across another installation of an operating system. For example, one or more of OSEs 174B-174N may endure and/or may persist across another installation of an operating system. For instance, one or more of OSEs 174B-174N may be reinstalled after another installation of an operating system.

Figure 2A:
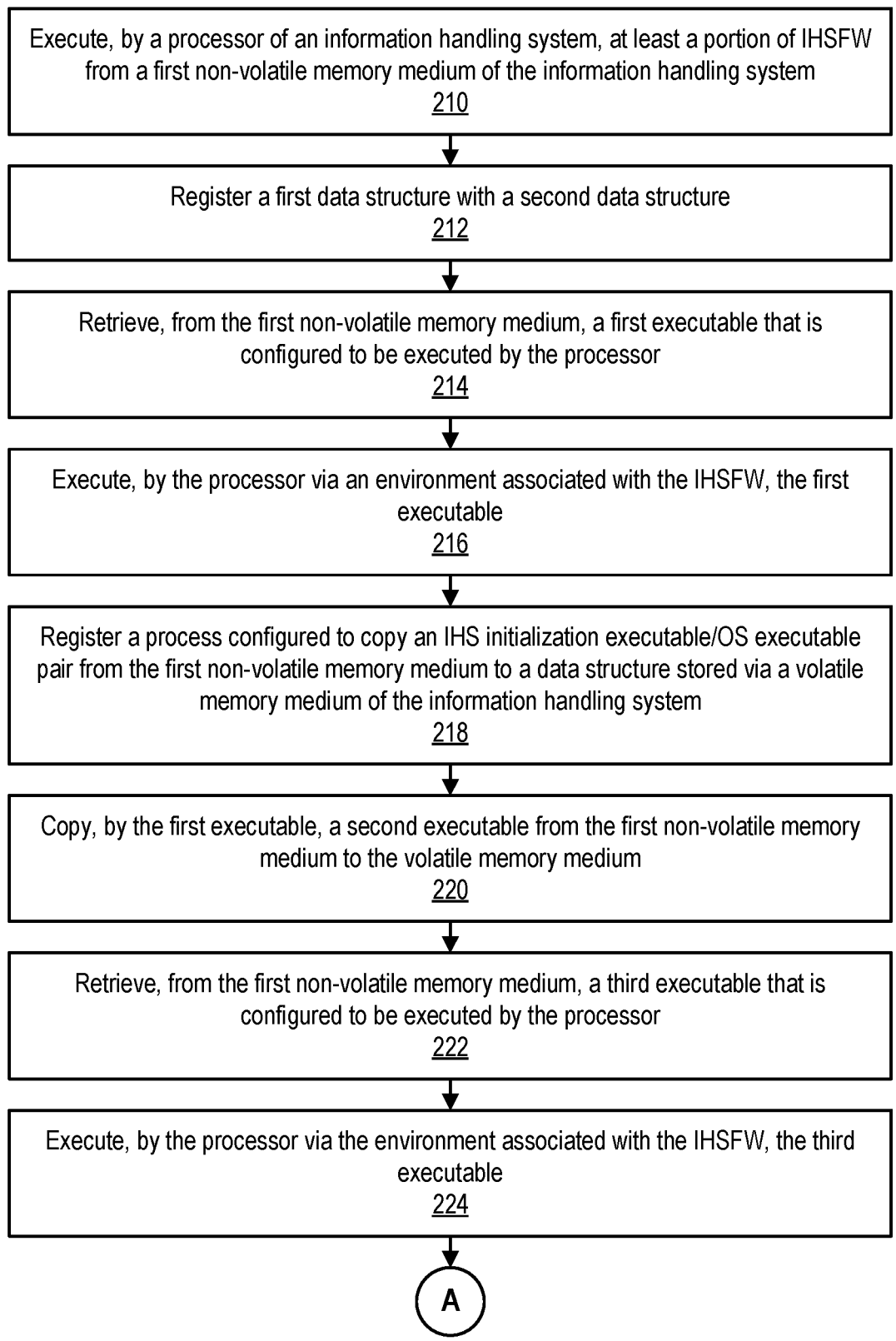
FIGS. 2A and 2B illustrate an example of a method of operating an information handling system, according to one or more embodiments.
Figure 2B:
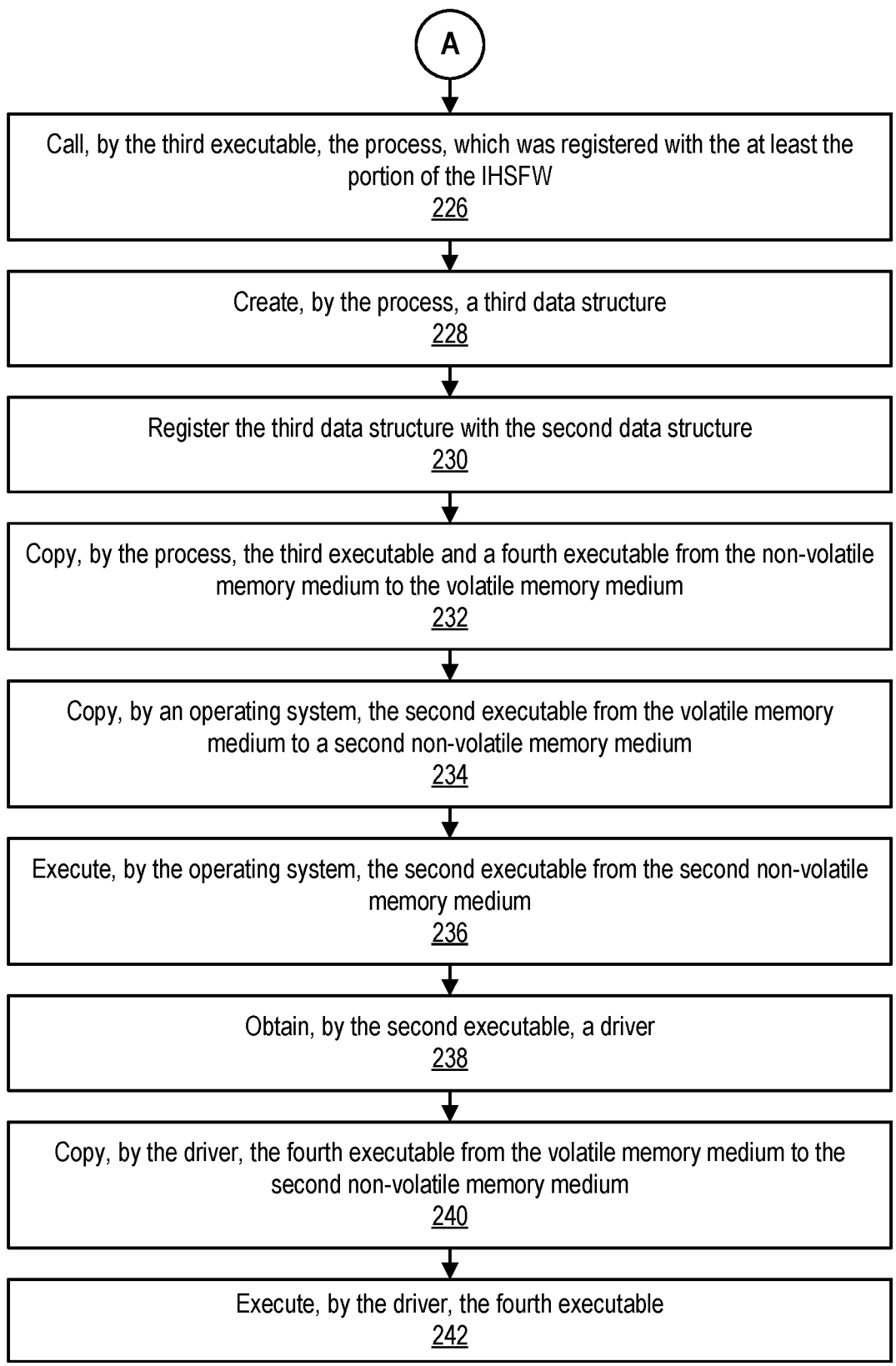

Turning now to FIGS. 2A and 2B, an example of a method of operating an information handling system is illustrated, according to one or more embodiments. At 210, at least a portion of IHSFW, from a first non-volatile memory medium of the information handling system, may be executed by a processor of the information handling system. For example, at least a portion of IHSFW 171, from non-volatile memory medium 170 of IHS 110, may be executed by processor 120 of IHS 110. In one or more embodiments, before executing, by the processor, the at least the portion of IHSFW, an operating system may be installed on a second non-volatile memory medium of the information handling system. For example, the second non-volatile memory medium of the information handling system may be different from the first non-volatile memory medium of the information handling system. For instance, before executing, by processor 120, the at least the portion of IHSFW 171, OS 162 may be installed on non-volatile memory medium 160. In one or more embodiments, the first non-volatile memory medium may include a serial interface flash memory device. For example, the serial interface flash memory device may be compliant with a serial bus and/or a serial protocol of a serial interface described herein.

Figure 2C:
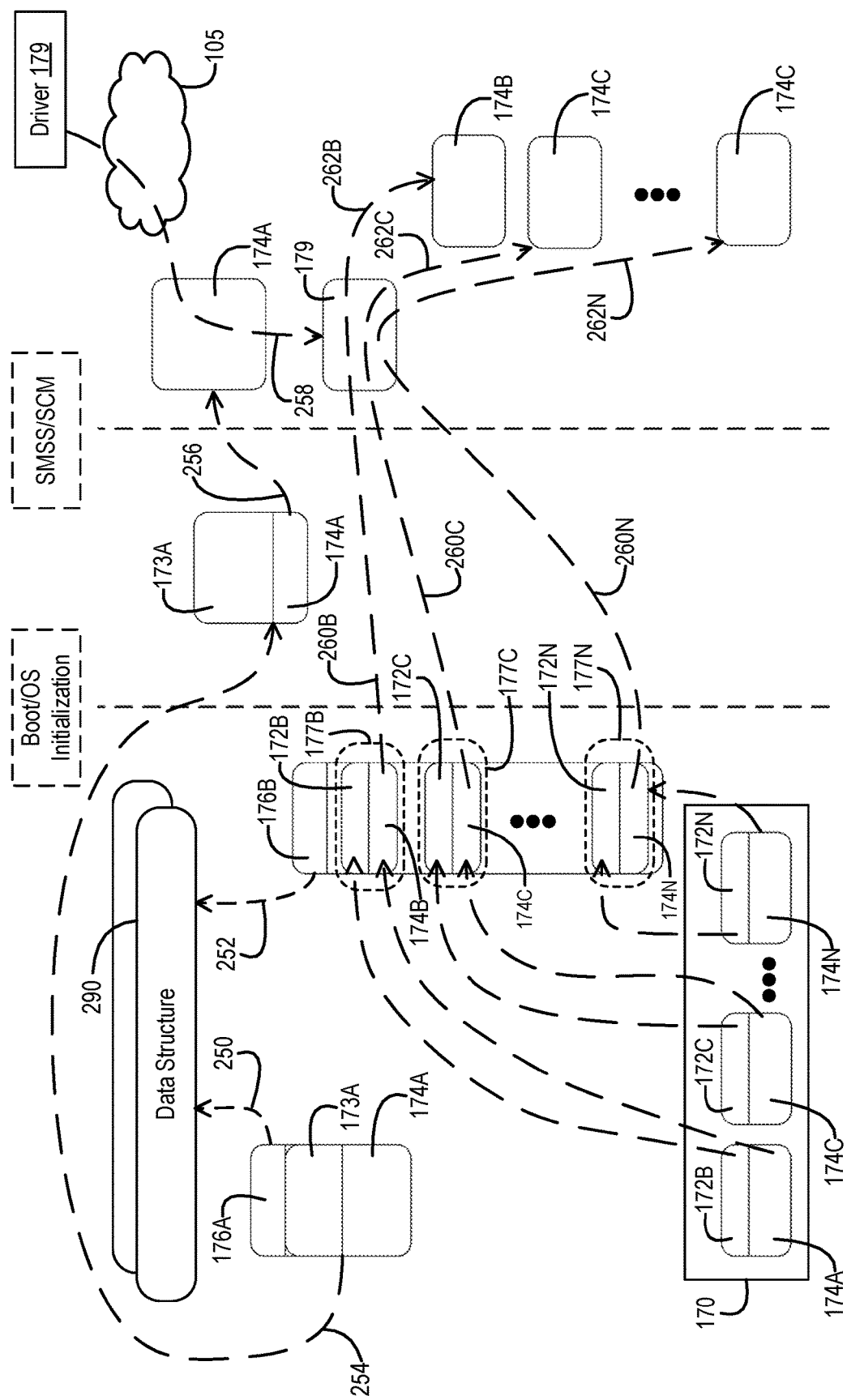
FIG. 2C illustrates an example of system flow of operating an information handling system, according to one or more embodiments.

At 212, a first data structure may be registered with a second data structure. For example, data structure 176A may be registered with a data structure 290, as illustrated in FIG. 2C. In one or more embodiments, data structure 176A may be compliant with an ACPI table. For example, data structure 176A may be or may include an ACPI table. In one or more embodiments, data structure 290 may be compliant with an ACPI table. For example, data structure 290 may be or may include an ACPI table. At 214, a first executable that is configured to be executed by the processor may be retrieved from the first non-volatile memory medium. For example, IHS initialization executable 172A may be retrieved from non-volatile memory medium 170.

At 216, the first executable may be executed by the processor via an environment associated with the IHSFW. For example, IHS initialization executable 172A may be executed by processor 120 via an environment associated with IHSFW 171. In one or more embodiments, the environment associated with IHSFW 171 may include a DXE. For example, a first DXE driver may include the first executable. For instance, a first DXE driver may include IHS initialization executable 172A. At 218, a process, configured to copy an IHS initialization executable/OS executable pair from the first non-volatile memory medium to a data structure stored via a volatile memory medium of the information handling system, may be registered. For example, process 175, configured to copy an IHS initialization executable/OS executable pair 172/174 from non-volatile memory medium 170 to data structure 176B stored via volatile memory medium 150 of IHS 110, may be registered. For instance, process 175 may include a subroutine, and the subroutine may be registered. As an example, the subroutine may be configured to copy an IHS initialization executable/OS executable pair 172/174 from non-volatile memory medium 170 to data structure 176B stored via volatile memory medium 150 of IHS 110.

In one or more embodiments, the process may be registered with the at least the portion of the IHSFW. For example, process 175 may be registered with at least the portion of IHSFW 171. In one or more embodiments, the process may include a subroutine. For example, the subroutine may be registered with the at least the portion of the IHSFW. For instance, the subroutine may be registered with the at least the portion of IHSFW 171. In one or more embodiments, the data structure stored via the volatile memory medium may include a table that is compliant with an ACPI table. For example, data structure 176B stored via volatile memory medium 150 may include a table that is compliant with an ACPI table. For instance, data structure 176B stored via volatile memory medium 150 may be or may include an ACPI table. In one or more embodiments, the table may be registered with an ACPI service. For example, data structure 176B may be registered with an ACPI service.

In one or more embodiments, the operating system may access the table via the ACPI service. For example, OS 162 may access the table via the ACPI service. For instance, OS 162 may access data structure 176B via the ACPI service. In one or more embodiments, OS 162 may access the ACPI service via a management information exchange. For example, OS 162 may access the ACPI service via one or more of a WMI and a CIM, among others.

At 220, a second executable may be copied, by the first executable, from the first non-volatile memory medium to the volatile memory medium. For example, OS executable 174A may be copied, by executable 172A, from non-volatile memory medium 170 to volatile memory medium 150.

At 222, a third executable that is configured to be executed by the processor may be retrieved from the first non-volatile memory medium. For example, IHS initialization executable 172B may be retrieved from non-volatile memory medium 170. At 224, the third executable may be executed by the processor via the environment associated with the IHSFW. For example, IHS initialization executable 172B may be executed by processor 120 via the environment associated with the IHSFW 171. In one or more embodiments, the environment associated with the IHSFW 171 may be a DXE. For example, a second DXE driver may include the third executable. For instance, a second DXE driver may include IHS initialization executable 172B.

At 226, the third executable may call the process, which was registered with the at least the portion of the IHSFW. For example, IHS initialization executable 172B may call process 175. For instance, IHS initialization executable 172B may call the subroutine included by process 175. At 228, the process may create a third data structure. For example, process 175 may create data structure 176B. For instance, the subroutine, included by process 175, may create data structure 176B. At 230, the third data structure may be registered with the second data structure. For example, data structure 176B may be registered with data structure 290, as shown in FIG. 2C. In one instance, process 175 may register data structure 176B with data structure 290. In another instance, the subroutine, included by process 175, may register data structure 176B with data structure 290.

At 232, the process may copy the third executable and a fourth executable from the non-volatile memory medium to the volatile memory medium. For example, process 175 may copy IHS initialization executable 172B and OSE 174B from non-volatile memory medium 170 to volatile memory medium 150. In one instance, process 175 may copy IHS initialization executable 172B and OSE 174B from non-volatile memory medium 170 to data structure 176B of volatile memory medium 150. In a second instance, process 175 may copy IHS initialization executable 172B and OSE 174B from non-volatile memory medium 170 to entry 177B of data structure 176B of volatile memory medium 150. In a third instance, the subroutine, included by process 175, may copy IHS initialization executable 172B and OSE 174B from non-volatile memory medium 170 to data structure 176B of volatile memory medium 150. In another instance, the subroutine, included by process 175, may copy IHS initialization executable 172B and OSE 174B from non-volatile memory medium 170 to entry 177B of data structure 176B of volatile memory medium 150.

At 234, an operating system may copy the second executable from the volatile memory medium to a second non-volatile memory medium. For example, OS 162 may copy OSE 174A from volatile memory medium 150 to non-volatile memory medium 160. For instance, OS 162 may copy OSE 174A from data structure 176A of volatile memory medium 150 to non-volatile memory medium 160. At 236, the operating system may execute the second executable from the second non-volatile memory medium. For example, OS 162 may execute OSE 174A from to non-volatile memory medium 160. In one or more embodiments, OSE 174A may include a service loader. For example, the service loader may load one or more services from non-volatile memory medium 160 to OS 162.

At 238, the second executable may obtain a driver. For example, OSE 174A may obtain driver 179. For instance, OSE 174A may obtain driver 179 from network 105. Referring to FIG. 1C, OSE 174A may obtain driver 179B from IHS 110B via network 105, according to one or more embodiments. For example, OSE 174A may store driver 179B as driver 179A. In one or more embodiments, OSE 174A may obtain driver 179C from BMC 130 via network 105. For example, OSE 174A may store driver 179C as driver 179A. Referring to FIG. 1D, OSE 174A may obtain driver 179C from BMC 130 via an internal communication coupling, according to one or more embodiments. For example, OSE 174A may store driver 179C as driver 179A.

Referring again to FIG. 2A, the driver may copy the fourth executable from the volatile memory medium to the second non-volatile memory medium, at 240. For example, driver 179 may copy OSE 174B from volatile memory medium 150 to non-volatile memory medium 160. In one instance, driver 179 may copy OSE 174B from data structure 176B of volatile memory medium 150 to non-volatile memory medium 160. In another instance, driver 179 may copy OSE 174B from entry 177B of data structure 176B of volatile memory medium 150 to non-volatile memory medium 160.

At 242, the driver may execute the fourth executable. For example, driver 179 may execute OSE 174B. For example, driver 179 executing OSE 174B may include driver 179 causing OSE 174B to be executed. In one or more embodiments, OSE 174B may include a service. In one example, driver 179 may load the service to OS 162. For instance, OS 162 may execute the service. In another example, driver 179 may start the service with OS 162.

Turning now to FIG. 2C, an example of system flow of operating an information handling system is illustrated, according to one or more embodiments. In one or more embodiments, OSE 174, accessible via data structure 176A, may be included by an IHSFW image, at 250. In one or more embodiments, OSE 174 may be or may include a platform binary. For example, data structure 176A may be or may include a WINDOWS® platform binary table (WPBT), which may be a part of a boot firmware image. For instance, during execution of instructions of the boot of the boot firmware image, the WPBT may be registered to data structure 290, which may be or may include an ACPI table. As an example, during a boot of IHSFW 171, the WPBT may be registered to data structure 290, which may be or may include an ACPI table. For instance, during a BIOS boot, the WPBT may be registered to data structure 290, which may be or may include an ACPI table.

In one or more embodiments, each of multiple independent software vendor (ISV)/original equipment manufacturers (OEM) vendors may have created its own vendor provided service (VPS) in a WPBT format. For example, the vendor provided services (VPSs) in the WPBT format may be included by the IHSFW image. In one or more embodiments, data structure 176B may include one or more IHS initialization executable/OS executable pairs. For example, data structure 176B may include one or more IHS initialization executable/OS executable pairs 172B/174B-172N/174N. For example, data structure 176B may include one or more entries 177B-177N, which may respectively include one or more IHS initialization executable/OS executable pairs 172B/174B-172N/174N.

In one or more embodiments, during execution of instructions of the boot of the boot firmware image, data structure 176B may be registered to data structure 290, at 252. For example, data structure 176B may be or may include an ACPI table. For instance, data structure 176B may be or may include a platform binary distribution table (PBDT). As an example, during execution of instructions of the boot of the boot firmware image, data structure 176B may be registered to data structure 290, which may be or may include another ACPI table. For instance, during execution of instructions of the boot of the boot firmware image, the PBDT may be registered to data structure 290.

In one or more embodiments, after an operating system has been altered or has been reinstalled in a "clean" configuration, the information handling system may boot, at 254. During at least a portion of booting the boot firmware image and an operating system initialization, OS 162 may read data structure 176A to obtain a memory location of OSE 174A, which may include a service loader, and may write OSE 174A to non-volatile memory medium to 160. Subsequently, OS 162 may execute OSE 174A. For example, a session manager subsystem (SMSS) of OS 162 may execute OSE 174A.

In one or more embodiments, during a UEFI boot and an operating system initialization, OS 162 may read the WPBT (e.g., data structure 176A) to obtain a physical memory location of a primary platform binary (e.g., OSE 174A), which includes a service loader, and may write flat image to disk, which may include the primary platform binary. Subsequently, OS 162 may execute the primary platform binary. For example, a SMSS of OS 162 may the primary platform binary.

In one or more embodiments, when OSE 174A is executed, OSE 174A may extract the service loader, at 256. For example, OSE 174A may install the service loader. For instance, a service control manager (SCM) of OS 162 may start the service loader as a service. In one or more embodiments, when the platform binary is executed, the platform binary may extract the service loader and install the service loader. For example, after the service loader is installed, a SCM of OS 162 may start the service loader as a service.

In one or more embodiments, the operating system initialization may transition from SMSS to SCM. For example, after the operating system initialization transitions from SMSS to SCM, the service loader may be started as a service by SCM. For instance, the service may obtain driver 179. As an example, the service may obtain driver 179 via network 105. For instance, network 105 may be or may include a content delivery network (CDN). In one or more embodiments, the service may install driver 179, at 258.

In one or more embodiments, OSE 174A may query data structure 176B and obtain OSEs 174B-174N via driver 179, at 260B-260N. For example, the service may query data structure 176B and may obtain OSEs 174B-174N via driver 179. For instance, the service may access entries 177B-177N of data structure 176B and may obtain OSEs 174B-174N via driver 179. In one or more embodiments, OSE 174A may install and may start OSEs 174B-174N, at 262B-262N. For example, the service may install and may start OSEs 174B-174N. For instance, OSEs 174B-174N may respectively include services, and the service of OSE 174A may install and start the services respectively of OSEs 174B-174N.

Figure 3A:
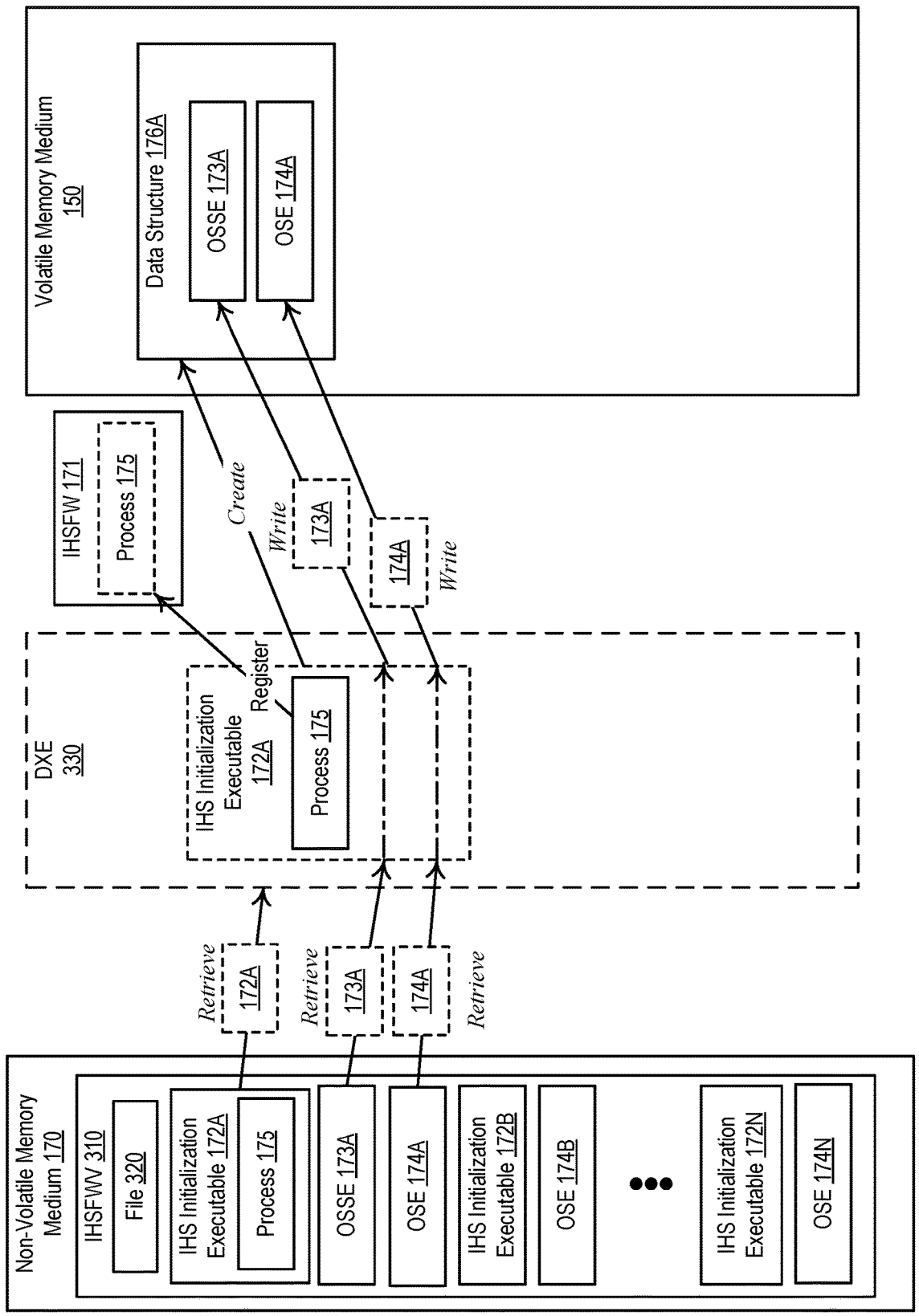
FIG. 3A illustrates an example of providing a first operating system executable to a volatile memory medium, according to one or more embodiments.

Turning now to FIG. 3A, an example of providing a first operating system executable to a volatile memory medium is illustrated, according to one or more embodiments. In one or more embodiments, non-volatile memory medium 170 may store an IHSFW volume (IHSFWV) 310. For example, IHSFWV 310 may include a file 320. In one or more embodiments, at least a portion of IHSFW 171 may determine an ordering of IHS initialization executables 172A-172N based at least on an ordering indicated by file 320. For example, the at least the portion of IHSFW 171 may include a DXE 330. For instance, file 320 may be or may include an a priori file. In one or more embodiments, a name of file 320 may include a globally unique identifier (GUID). For example, DXE 330 may store the name of file 320. For instance, DXE 330 may retrieve file 320 from IHSFWV 310 based at least on the name of file 320. In one or more embodiments, DXE 330 may include a DXE dispatcher. For example, the DXE dispatcher may store the name of file 320. For instance, the DXE dispatcher may retrieve file 320 from IHSFWV 310 based at least on the name of file 320.

In one or more embodiments, DXE 330 may retrieve IHS initialization executable 172A from non-volatile memory medium 170. For example, DXE 330 may retrieve IHS initialization executable 172A from IHSFWV 310. In one or more embodiments, a first IHS initialization executable/OS executable pair may include IHS initialization executable 172A and OSE 174A. In one or more embodiments, processor 120 may execute IHS initialization executable 172A via DXE 330. For example, IHS initialization executable 172A may include a DXE driver. In one or more embodiments, IHS initialization executable 172A may register process 175 with IHSFW 171. In one or more embodiments, process 175 may include a subroutine. For example, the subroutine, included by process 175, may include instructions, executable by processor 120, to implement at least a portion of one or more systems, at least a portion of one or more flowcharts, at least a portion of one or more methods, and/or at least a portion of one or more processes described herein. For instance, processor 120 may execute processor instructions of the subroutine, included by process 175, in implementing at least a portion of one or more systems, at least a portion of one or more flowcharts, at least a portion of one or more methods, and/or at least a portion of one or more processes described herein. In one or more embodiments, one or more of IHS initialization executables 172B-172N may call process 175. For example, one or more of IHS initialization executables 172B-172N may call the subroutine included by process 175.

In one or more embodiments, IHS initialization executable 172A may create data structure 176A in volatile memory medium 150. For example, data structure 176A may be compliant with an ACPI table. For instance, data structure 176A may be or may include an ACPI table. In one or more embodiments, OSSE 173A may be retrieved from non-volatile memory medium 170. For example, IHS initialization executable 172A may retrieve OSSE 173A from non-volatile memory medium 170. For instance, OSSE 173A may be retrieved from IHSFWV 310. In one or more embodiments, IHS initialization executable 172A may write OSSE 173A to volatile memory medium 150. For example, IHS initialization executable 172A may write OSSE 173A to data structure 176A. In one or more embodiments, OSE 174A may be retrieved from non-volatile memory medium 170. For example, IHS initialization executable 172A may retrieve OSE 174A from non-volatile memory medium 170. For instance, OSE 174A may be retrieved from IHSFWV 310. In one or more embodiments, IHS initialization executable 172A may write OSE 174A to volatile memory medium 150. For example, IHS initialization executable 172A may write OSE 174A to data structure 176A.

Figure 3B:
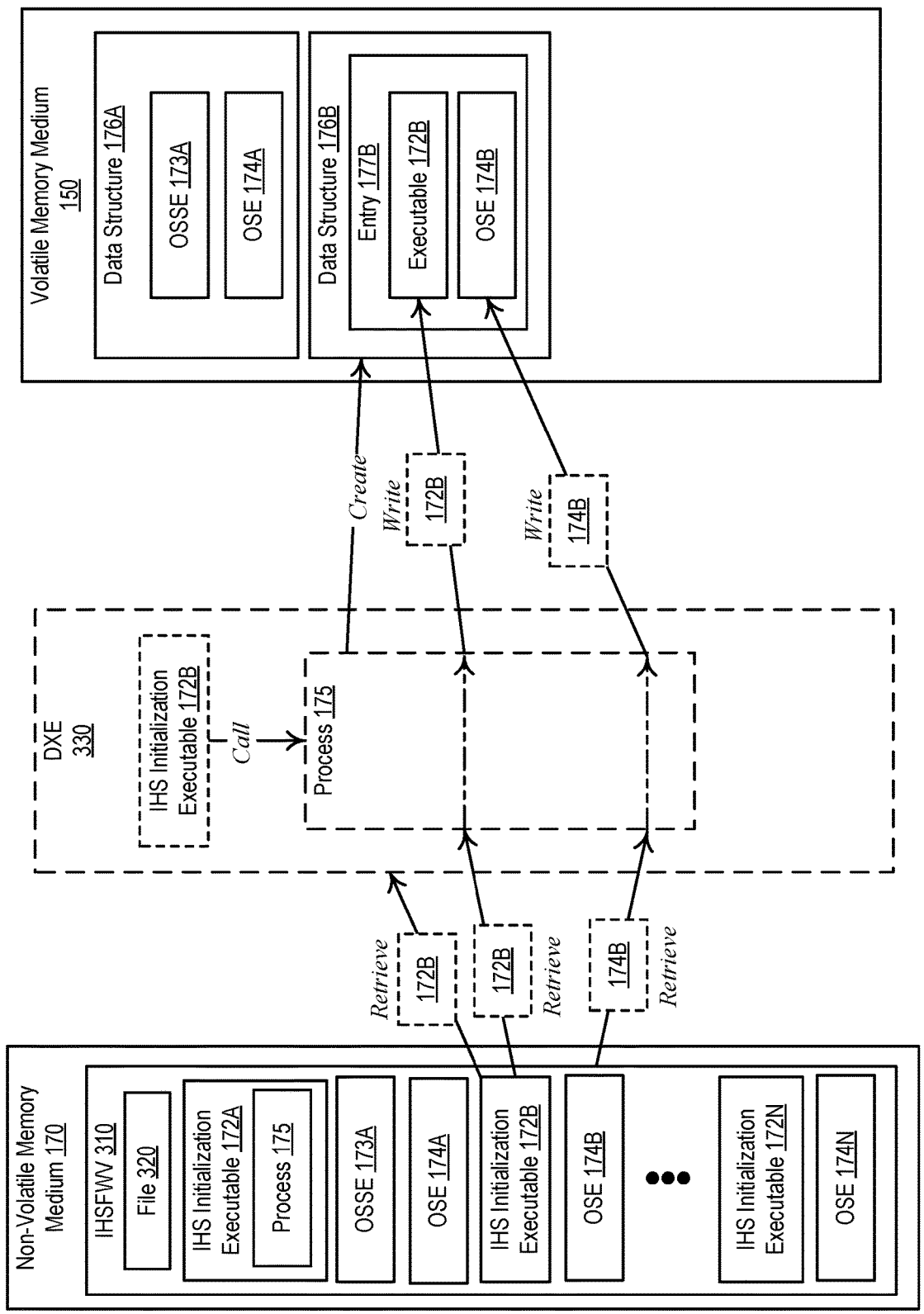
FIG. 3B illustrates an example of providing a second operating system executable to a volatile memory medium, according to one or more embodiments.

Turning now to FIG. 3B, an example of providing a second operating system executable to a volatile memory medium is illustrated, according to one or more embodiments. In one or more embodiments, DXE 330 may retrieve IHS initialization executable 172B from non-volatile memory medium 170. For example, DXE 330 may retrieve IHS initialization executable 172B from IHSFWV 310. In one or more embodiments, a second IHS initialization executable/OS executable pair may include IHS initialization executable 172B and OSE 174B. In one or more embodiments, processor 120 may execute IHS initialization executable 172B via DXE 330. For example, IHS initialization executable 172B may include a DXE driver.

In one or more embodiments, IHS initialization executable 172B may call process 175. For example, calling process 175 may include calling the subroutine included by process 175. In one or more embodiments, process 175 may create data structure 176B in volatile memory medium 150. For example, the subroutine, included by process 175, may create data structure 176B in volatile memory medium 150. In one or more embodiments, data structure 176B may be compliant with an ACPI table. For example, data structure 176B may be or may include an ACPI table. In one or more embodiments, OSE 174B may be retrieved from non-volatile memory medium 170. For example, process 175 may retrieve OS executable 174B from non-volatile memory medium 170. For instance, the subroutine, included by process 175, may retrieve OS executable 174B from non-volatile memory medium 170. As an example, OSE 174B may be retrieved from IHSFWV 310. In one or more embodiments, process 175 may write OS executable 174B to volatile memory medium 150. For example, process 175 may write OS executable 174B to data structure 176B. For instance, the subroutine, included by process 175, may write OS executable 174B to data structure 176B.

Figure 3C:
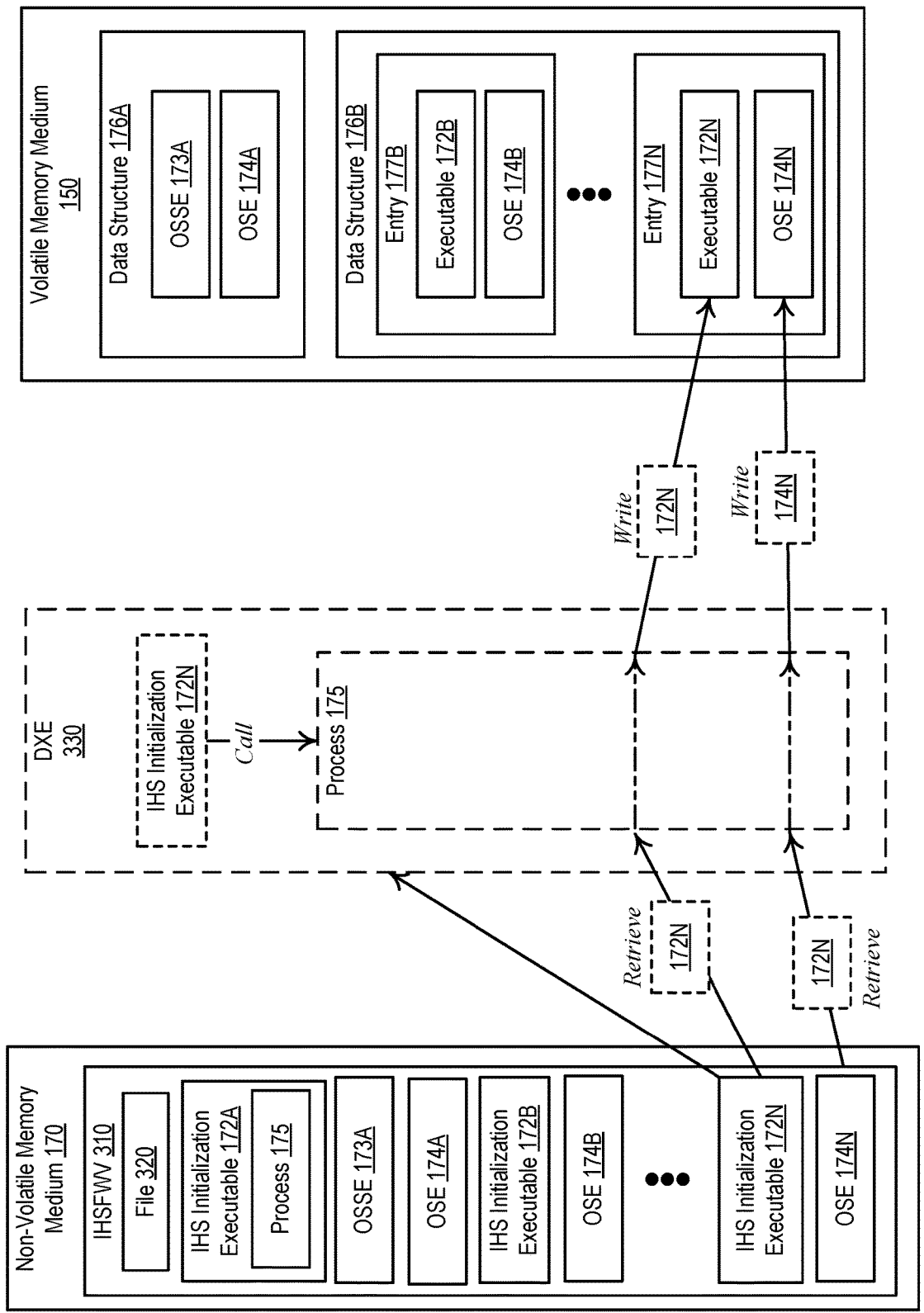
FIG. 3C illustrates an example of providing a Nth operating system executable to a volatile memory medium, according to one or more embodiments.

Turning now to FIG. 3C, an example of providing a Nth operating system executable to a volatile memory medium is illustrated, according to one or more embodiments. In one or more embodiments, DXE 330 may retrieve IHS initialization executable 172N from non-volatile memory medium 170. For example, DXE 330 may retrieve IHS initialization executable 172N from IHSFWV 310. In one or more embodiments, a Nth IHS initialization executable/OS executable pair may include IHS initialization executable 172N and OS executable 174N. In one or more embodiments, processor 120 may execute IHS initialization executable 172N via DXE 330. For example, IHS initialization executable 172N may include a DXE driver.

In one or more embodiments, IHS initialization executable 172N may call process 175. For example, calling process 175 may include calling the subroutine included by process 175. In one or more embodiments, OSE 174N may be retrieved from non-volatile memory medium 170. For example, process 175 may retrieve OS executable 174N from non-volatile memory medium 170. For instance, the subroutine, included by process 175, may retrieve OS executable 174N from non-volatile memory medium 170. As an example, OSE 174N may be retrieved from IHSFWV 310. In one or more embodiments, process 175 may write OS executable 174N to volatile memory medium 150. For example, process 175 may write OS executable 174N to data structure 176B. For instance, the subroutine, included by process 175, may write OS executable 174N to data structure 176B.

Figure 3D:
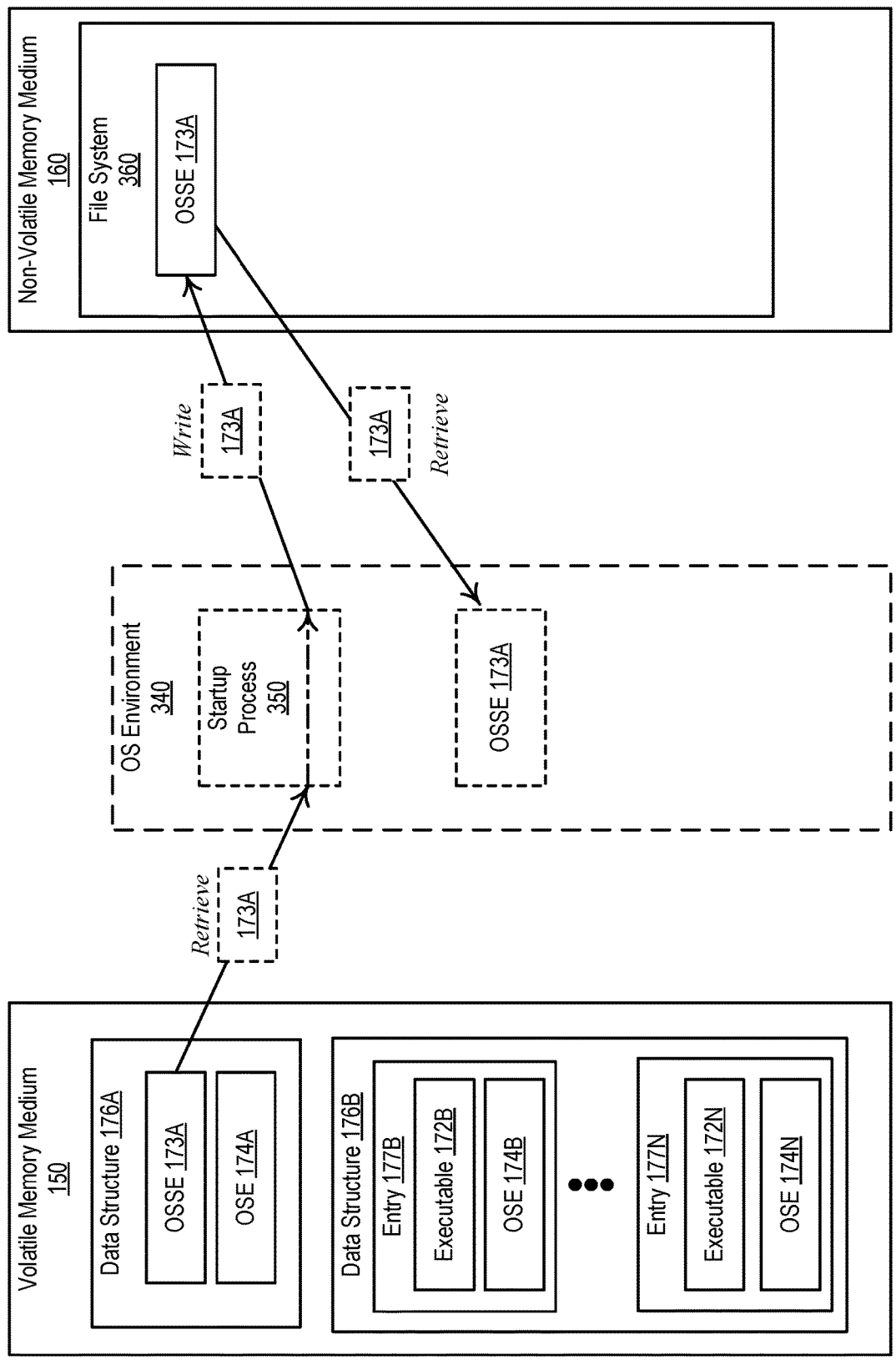
FIG. 3D illustrates an example of providing an operating system setup executable to a non-volatile memory medium, according to one or more embodiments.

Turning now to FIG. 3D, an example of providing an operating system setup executable to a non-volatile memory medium is illustrated, according to one or more embodiments. In one or more embodiments, an OS environment 340 may include a startup process 350. In one or more embodiments, OS environment 340 may include OS 162 executed by processor 120. In one or more embodiments, startup process 350 may include a platform application controller. For example, startup process 350 may include one or more structures and/or one or more functionalities of a session manager.

In one or more embodiments, startup process 350 may retrieve OSSE 173A from volatile memory medium 150. For example, startup process 350 may retrieve OSSE 173A from data structure 176A. In one or more embodiments, startup process 350 may write OSSE 173A to non-volatile memory medium 160. For example, non-volatile memory medium 160 may include a file system 360. For instance, startup process 350 may write OSSE 173A to file system 360. In one or more embodiments, OSSE 173A may be retrieved from non-volatile memory medium 160. For example, OSSE 173A may be retrieved from file system 360. For example, startup process 350 may retrieve OSSE 173A from file system 360. In one or more embodiments, OSSE 173A may be executed via OS environment 340. For example, processor 120 may execute OSSE 173A via OS environment 340. In one or more embodiments, startup process 350 may instruct processor 120 to execute OSSE 173A. For example, startup process 350 may instruct processor 120 to execute OSSE 173A via OS environment 340.

Figure 3E:
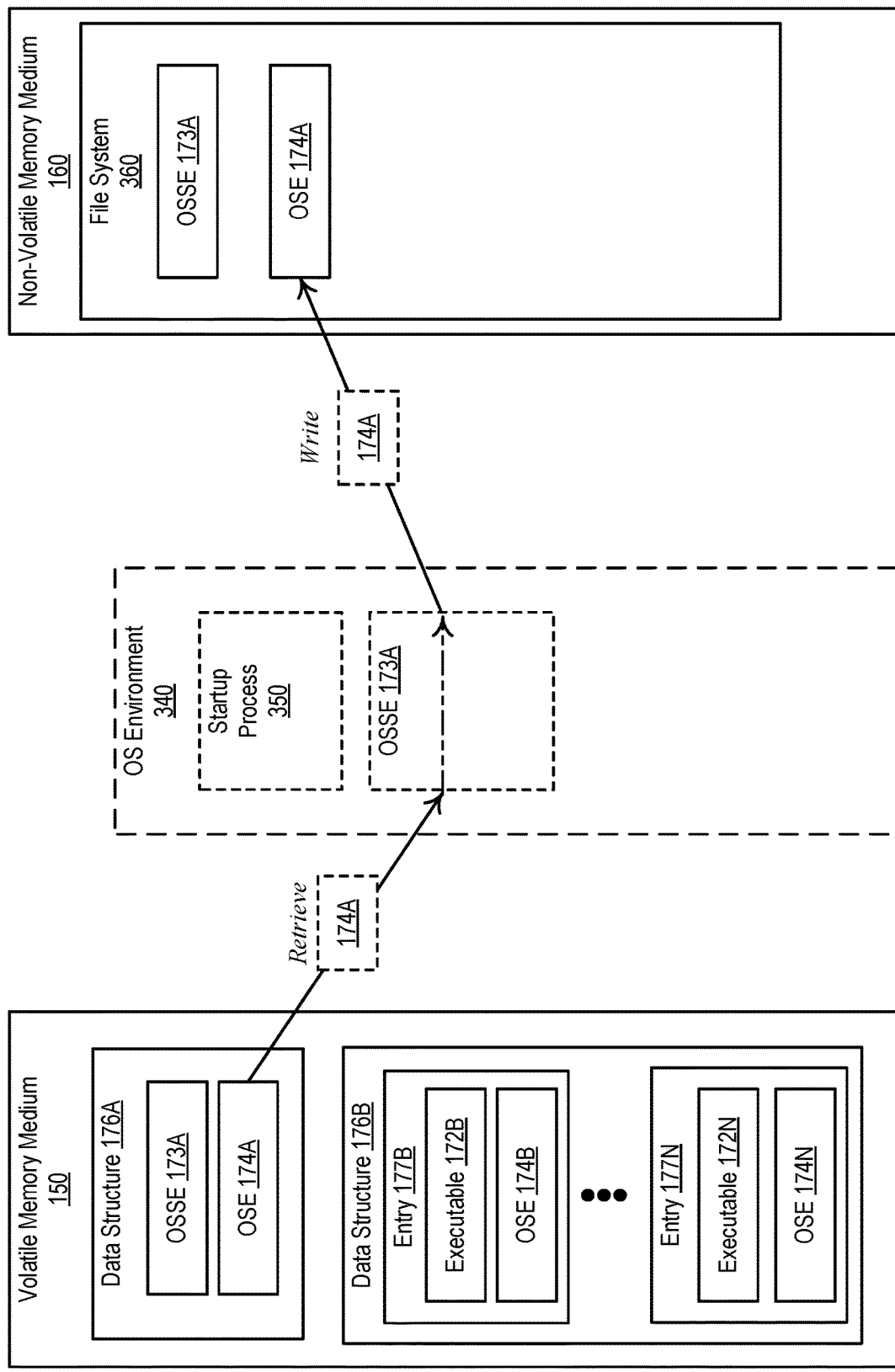
FIG. 3E illustrates an example of providing an operating system executable to a non-volatile memory medium, according to one or more embodiments.

Turning now to FIG. 3E, an example of providing an operating system executable to a non-volatile memory medium is illustrated, according to one or more embodiments. In one or more embodiments, OSSE 173A may retrieve OSE 174A from volatile memory medium 150. For example, OSSE 173A may retrieve OS2E 174A from data structure 176A. In one or more embodiments, OSSE 173A may write OSE 174A to non-volatile memory medium 160. For example, OSSE 173A may write OSE 174A to file system 360. In one or more embodiments, OSE 174A may be retrieved from non-volatile memory medium 160. For example, OSE 174A may be retrieved from file system 360. For example, OSSE 173A may retrieve OSE 174A from file system 360. In one or more embodiments, OSE 174A may be executed via OS environment 340. For example, processor 120 may execute OSE 174A via OS environment 340. In one or more embodiments, OSSE 173A may instruct processor 120 to execute OSE 174A. For example, OSSE 173A may instruct processor 120 to execute OSE 174A via OS environment 340. In one or more embodiments, OSE 174A may include a service. For example, OSSE 173A may include a service loader. For instance, the service loader may start the service.

Figure 3F:
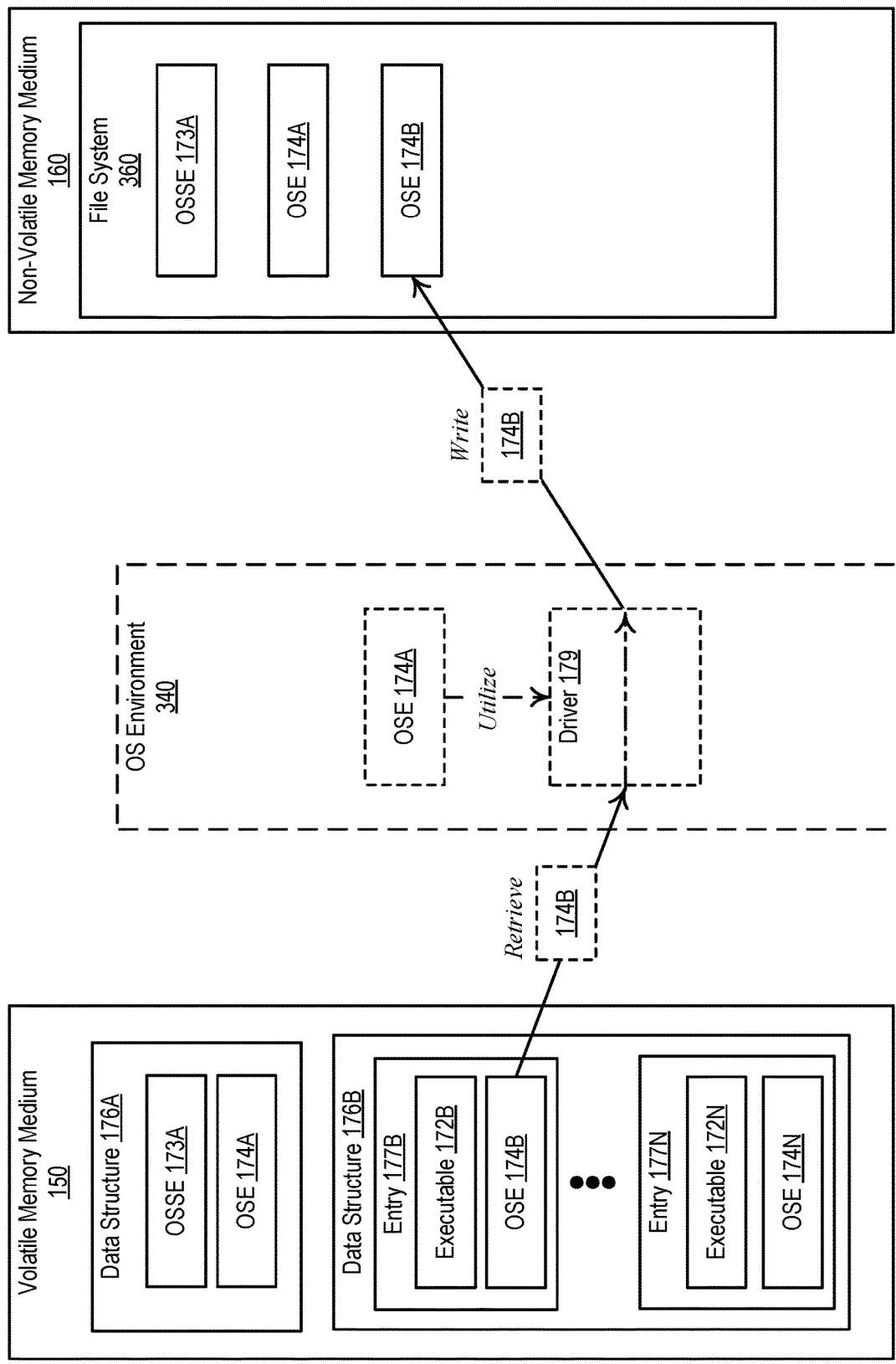
FIG. 3F illustrates an example of providing a second operating system executable to a non-volatile memory medium, according to one or more embodiments.

Turning now to FIG. 3F, an example of providing a second operating system executable to a non-volatile memory medium is illustrated, according to one or more embodiments. In one or more embodiments, OSE 174A may utilize driver 179. For example, OSE 174A may utilize driver 179 while processor 120 is executing OSE 174A. For instance, processor 120 may execute driver 179 while processor 120 is executing OSE 174A. In one or more embodiments, OSE 174A may utilize driver 179 to access memory portion 152A. For example, OSE 174A may utilize driver 179 to access addresses associated with memory portion 152A. In one or more embodiments, memory portion 152A may be associated with an address range that is accessible by a kernel of OS 162. For example, driver 179 may be loaded into the kernel of OS 162. In one instance, the address range associated with memory portion 152A may be accessed in a privileged mode. In another instance, the address range associated with memory portion 152A may not be accessible by a user space application and/or may not be accessible by instructions that are executed from user space. In one or more embodiments, OSE 174A may execute from user space. For example, OSE 174A, which may execute from user space, may utilize driver 179 to access memory portion 152A, which may be otherwise be inaccessible by OSE 174A. For instance, OSE 174A may utilize driver 179 to access and/or retrieve one or more of OSEs 174B-174N stored via memory portion 152A.

In one or more embodiments, OSE 174B may be retrieved from volatile memory medium 150. For example, OSE 174A may retrieve OSE 174B from volatile memory medium 150. For instance, OSE 174A may utilize driver 179 to retrieve OSE 174B from volatile memory medium 150. As an example, driver 179 may retrieve OSE 174B from volatile memory medium 150. In one or more embodiments, OSE 174B may be written to non-volatile memory medium 160. For example, OSE 174B may be written to file system 360. In one or more embodiments, OSE 174A may write OSE 174B to non-volatile memory medium 160. For example, OSE 174A may utilize driver 179 to write OSE 174B to non-volatile memory medium 160. For instance, driver 179 may write OSE 174B to non-volatile memory medium 160.

Figure 3G:
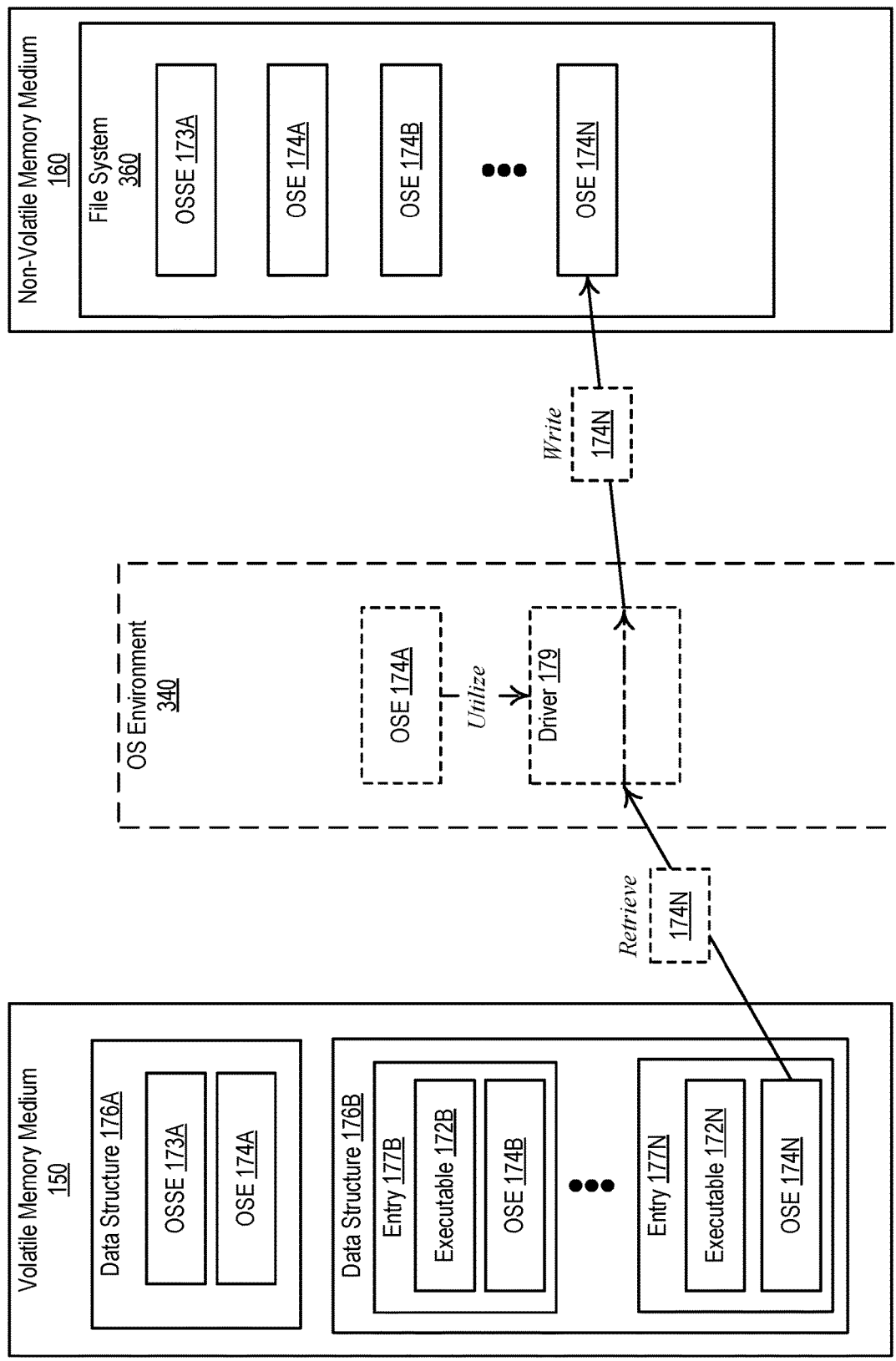
FIG. 3G illustrates an example of providing a Nth operating system executable to a non-volatile memory medium, according to one or more embodiments.

Turning now to FIG. 3G, an example of providing a Nth operating system executable to a non-volatile memory medium is illustrated, according to one or more embodiments. In one or more embodiments, OSE 174N may be retrieved from volatile memory medium 150. For example, OSE 174A may retrieve OSE 174N from volatile memory medium 150. For instance, OSE 174A may utilize driver 179 to retrieve OSE 174N from volatile memory medium 150. As an example, driver 179 may retrieve OSE 174N from volatile memory medium 150. In one or more embodiments, OSE 174N may be written to non-volatile memory medium 160. For example, OSE 174N may be written to file system 360. In one or more embodiments, OSE 174A may write OSE 174N to non-volatile memory medium 160. For example, OSE 174A may utilize driver 179 to write OSE 174N to non-volatile memory medium 160. For instance, driver 179 may write OSE 174N to non-volatile memory medium 160. In one or more embodiments, one or more of OSEs 174B-174N may respectively be or may respectively include one or more vendor provided services. For example, a SCM of OS 162 may launch (e.g., start) and/or execute the one or more vendor provided services.

Figure 4:
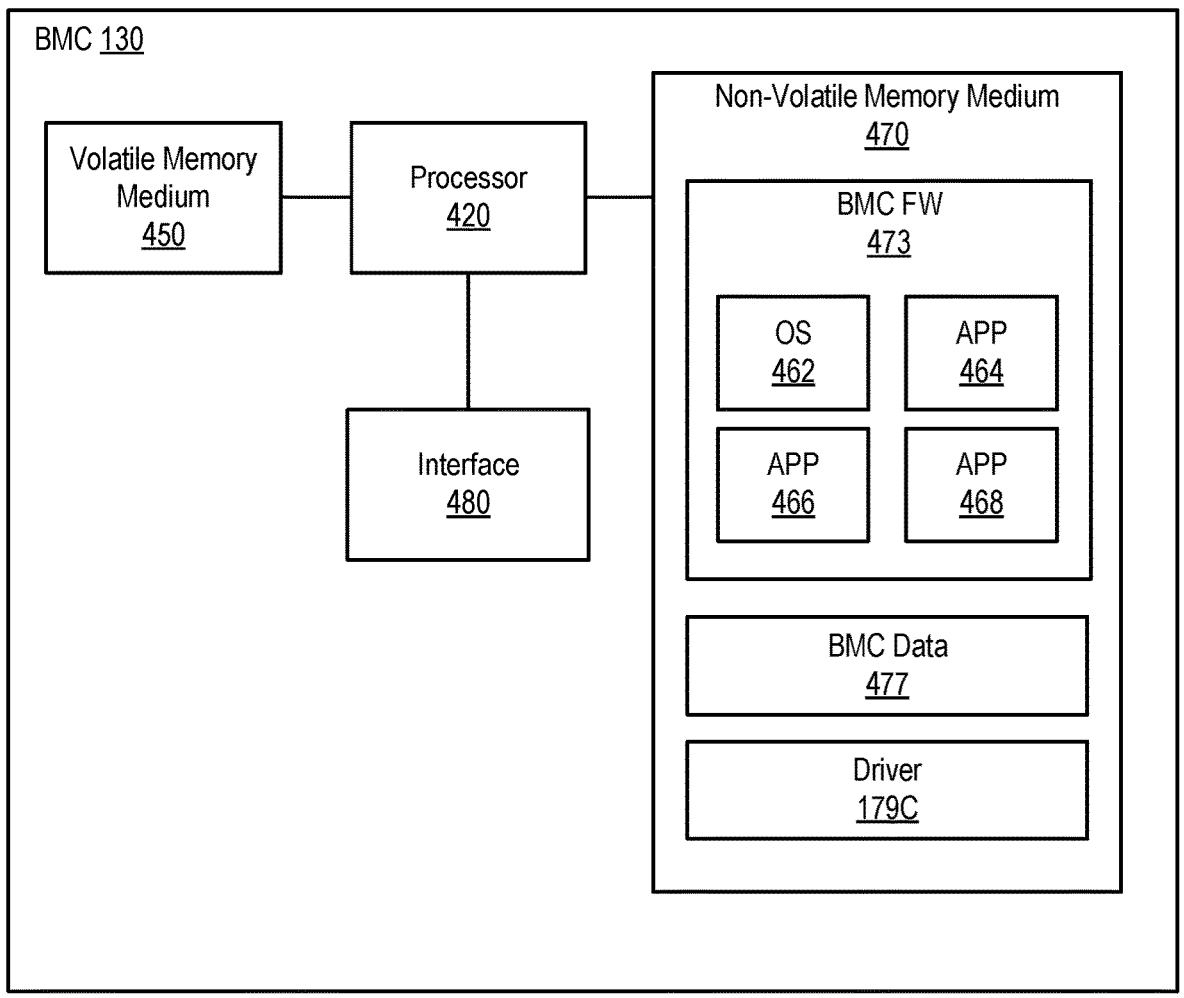
FIG. 4 illustrates an example of a baseboard management controller, according to one or more embodiments.

Turning now to FIG. 4, an example of a baseboard management controller is illustrated, according to one or more embodiments. As shown, BMC 130 may include a processor 420, a volatile memory medium 450, a non-volatile memory medium 470, and an interface 480. As illustrated, non-volatile memory medium 470 may include a BMC firmware (FW) 473, which may include an OS 462 and APPs 464-468, and may include BMC data 477. In one example, OS 462 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 462 may be or include an Unix-like operating system. For instance, the Unix-like operating system may be or include LINUX®, FREEBSD®, NETBSD®, OpenBSD, Minix, Xinu, or Darwin, among others. In another example, OS 462 may be or include a portable operating system interface (POSIX) compliant operating system. In one or more embodiments, non-volatile memory medium 470 may include driver 179C. For example, non-volatile memory medium 470 may store driver 179C.

In one or more embodiments, interface 480 may include circuitry that enables communicatively coupling to one or more devices. In one example, interface 480 may include circuitry that enables communicatively coupling to one or more buses. For instance, the one or more buses may include one or more buses described herein, among others. In a second example, interface 480 may include circuitry that enables one or more interrupt signals to be received. In one instance, interface 480 may include general purpose input/output (GPIO) circuitry, and the GPIO circuitry may enable one or more interrupt signals to be received and/or provided via at least one interrupt line. In another instance, interface 480 may include GPIO circuitry that may enable BMC 130 to provide and/or receive signals associated with other circuitry (e.g., diagnostic circuitry, etc.). In a third example, interface 480 may include circuitry that enables communicatively coupling to one or more networks. In one instance, interface 480 may include circuitry that enables communicatively coupling to network interface 197. In another example, interface 480 may include a network interface. In one or more embodiments, BMC 130 may provide driver 179C via interface 480. In one example, BMC 130 may provide driver 179C to network 105 via interface 480. For instance, processor 420 may provide driver 179C to network 105 via interface 480. In another example, BMC 130 may provide driver 179C to processor 120 via interface 480. For instance, processor 420 may provide driver 179C to processor 120 via interface 480. As an example, interface 480 may be communicatively coupled to processor 120. As another example, interface 480 may be communicatively coupled to volatile memory medium 150. For instance, processor 420 may provide driver 179C to volatile memory medium 150 via interface 480.

In one or more embodiments, one or more of OS 462 and APPs 464-468 may include processor instructions executable by processor 420. In one example, processor 420 may execute processor instructions of one or more of OS 462 and APPs 464-468 via non-volatile memory medium 470. In another example, one or more portions of the processor instructions of the one or more of OS 462 and APPs 464-468 may be transferred to volatile memory medium 450, and processor 420 may execute the one or more portions of the processor instructions of the one or more of OS 462 and APPs 464-468 via volatile memory medium 450. In one or more embodiments, processor 420 may execute instructions in accordance with at least a portion of one or more systems, at least a portion of one or more flowcharts, one or more methods, and/or at least a portion of one or more processes described herein. For example, non-volatile memory medium 470 and/or volatile memory medium 450 may store instructions that may be executable in accordance with at least a portion of one or more systems, at least a portion of one or more flowcharts, at least a portion of one or more methods, and/or at least a portion of one or more processes described herein. In one or more embodiments, processor 420 may execute instructions in accordance with at least a portion of one or more of systems, flowcharts, at least a portion of one or more methods, and/or at least a portion of one or more processes described herein. For example, non-volatile memory medium 470 and/or volatile memory medium 450 may store instructions that may be executable in accordance with at least a portion of one or more of systems, at least a portion of one or more flowcharts, at least a portion of one or more methods, and/or at least a portion of one or more processes described herein. In one or more embodiments, processor 420 may utilize BMC data 477. In one example, processor 420 may utilize BMC data 477 via non-volatile memory medium 470. In another example, one or more portions of BMC data 477 may be transferred to volatile memory medium 450, and processor 420 may utilize BMC data 477 via volatile memory medium 450.

Figure 5A:
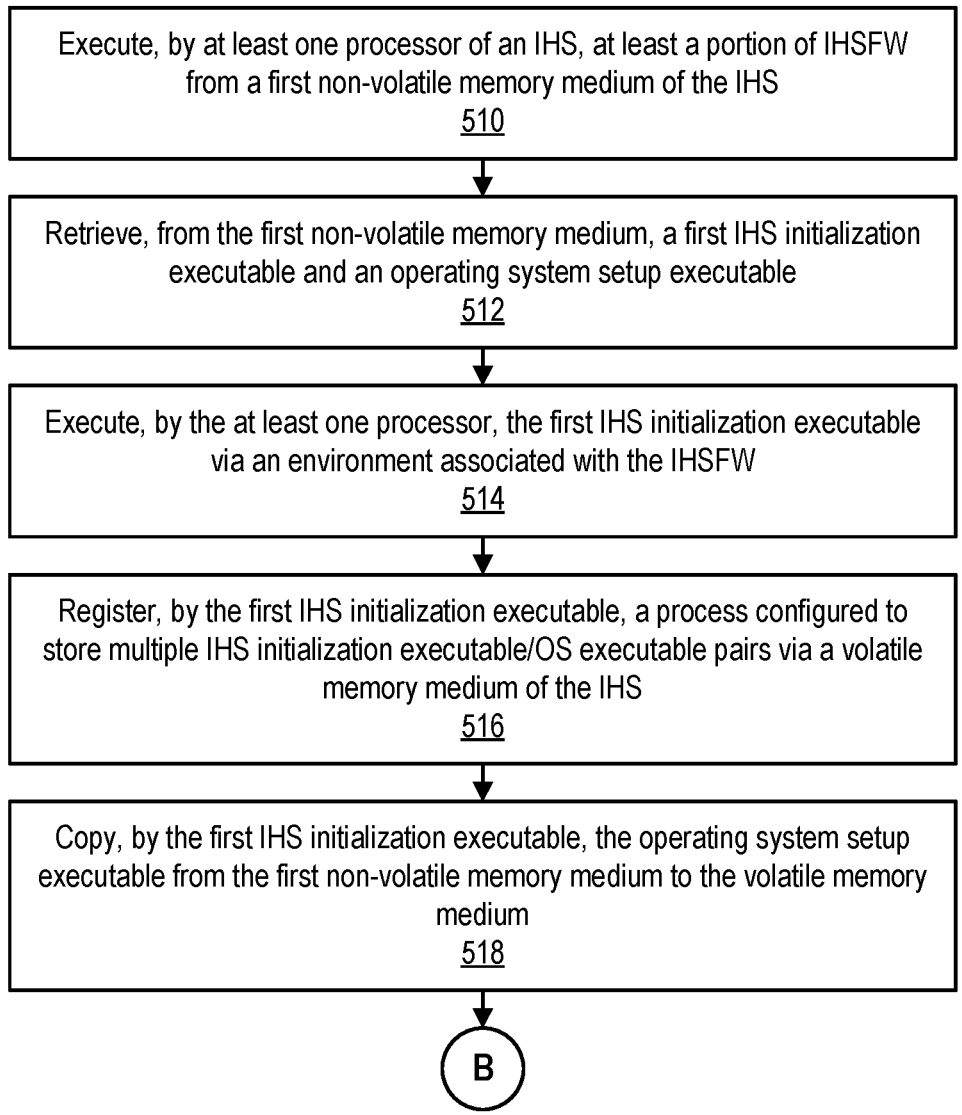
FIGS. 5A and 5B illustrate another example of a method of operating an information handling system, according to one or more embodiments.
Figure 5B:
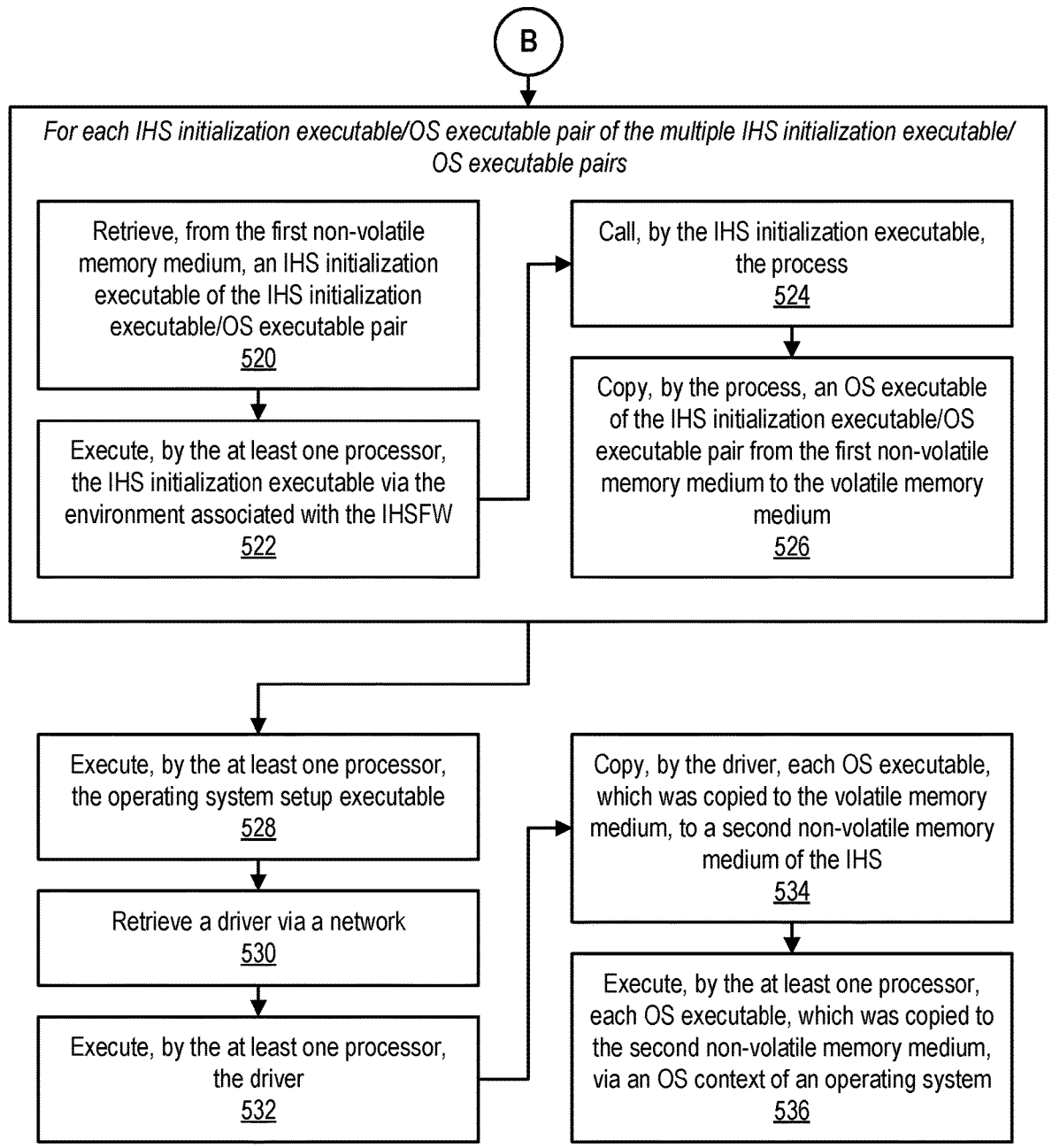

Turning now to FIGS. 5A and 5B, another example of a method of operating an information handling system is illustrated, according to one or more embodiments. At 510, at least one processor of an IHS may execute at least a portion of IHSFW from a first non-volatile memory medium of the IHS. For example, processor 120 may execute at least a portion of IHSFW 171 from non-volatile memory medium 170.

At 512, a first IHS initialization executable and an operating system setup executable may be retrieved from the first non-volatile memory medium. For example, IHS initialization executable 172A and OSSE 173A may be retrieved from non-volatile memory medium 170. For instance, processor 120 may retrieve IHS initialization executable 172A from non-volatile memory medium 170. In one or more embodiments, DXE 330 may retrieve IHS initialization executable 172A from non-volatile memory medium 170.

At 514, the first IHS initialization executable may be executed by the at least one processor via an environment associated with the IHSFW. For example, processor 120 may execute IHS initialization executable 172A via DXE 330 associated with IHSFW 171.

At 516, the first IHS initialization executable may register a process configured to store multiple IHS initialization executable/OS executable pairs via a volatile memory medium of the IHS. For example, IHS initialization executable 172A may register process 175. For instance, IHS initialization executable 172A may register process 175 with IHSFW 171. In one or more embodiments, the process may include a subroutine configured to store multiple IHS initialization executable/OS executable pairs via the volatile memory medium of the IHS. For example, IHS initialization executable 172A may register the subroutine included by process 175. For instance, IHS initialization executable 172A may register the subroutine, included by process 175, with IHSFW 171.

At 518, the first IHS initialization executable may copy the operating system setup executable from the first non-volatile memory medium to the volatile memory medium. For example, IHS initialization executable 172A may copy OSSE 173A from non-volatile memory medium 170 to volatile memory medium 150.

In one or more embodiments, method elements 520-526 may be performed for each IHS initialization executable/OS executable pair of multiple IHS initialization executable/OS executable pairs. For example, method elements 520-526 may be performed for each IHS initialization executable/OS executable pair of the multiple IHS initialization executable/OS executable pairs 172B/174B-172N/174N.

At 520, an IHS initialization executable of the multiple IHS initialization executable/OS executable pairs may be retrieved from the first non-volatile memory medium. For example, an IHS initialization executable 172 of IHS initialization executables 172B-172N may be retrieved from non-volatile memory medium 170. In one instance, IHS initialization executable 172B of IHS initialization executable 172B/OS executable 174B pair may be retrieved from non-volatile memory medium 170. In another instance, IHS initialization executable 172N of IHS initialization executable 172N/OS executable 174N pair may be retrieved from non-volatile memory medium 170.

At 522, the at least one processor may execute the IHS initialization executable via the environment associated with the IHSFW. For example, processor 120 may execute IHS initialization executable 172 of IHS initialization executables 172B-172N via the environment associated with IHSFW 171. In one instance, processor 120 may execute IHS initialization executable 172B via the environment associated with IHSFW 171. In another instance, processor 120 may execute IHS initialization executable 172N via the environment associated with IHSFW 171. In one or more embodiments, the environment associated with IHSFW 171 may be or may include DXE 330.

At 524, the IHS initialization executable may call the process. For example, IHS initialization executable 172 of IHS initialization executables 172B-172N may call process 175. In one instance, IHS initialization executable 172B may call process 175, as illustrated in FIG. 3B. In another instance, IHS initialization executable 172N may call process 175, as illustrated in FIG. 3C.

At 526, the process may copy an OS executable of the IHS initialization executable/OS executable pair from the first non-volatile memory medium to the volatile memory medium. For example, process 175 may copy an OSE 174 of IHS initialization executable/OS executable pair 172/174 from non-volatile memory medium 170 to volatile memory medium 150. In one instance, process 175 may copy OSE 174B of IHS initialization executable/OS executable pair 172B/174B from non-volatile memory medium 170 to volatile memory medium 150, as illustrated in FIG. 3B. In another instance, process 175 may copy OSE 174N of IHS initialization executable/OS executable pair 172N/174N from non-volatile memory medium 170 to volatile memory medium 150, as illustrated in FIG. 3C.

In one or more embodiments, copying, by the process, the OS executable of the IHS initialization executable/OS executable pair from the first non-volatile memory medium to the volatile memory medium may include copying, by the process, the IHS initialization executable/OS executable pair from the first non-volatile memory medium to the volatile memory medium. For example, process 175 may copy IHS initialization executable/OS executable pair 172/174 from non-volatile memory medium 170 to volatile memory medium 150. In one instance, process 175 may copy initialization executable/OS executable pair 172B/174B from non-volatile memory medium 170 to volatile memory medium 150, as illustrated in FIG. 3B. In another instance, process 175 may copy IHS initialization executable/OS executable pair 172N/174N from non-volatile memory medium 170 to volatile memory medium 150, as illustrated in FIG. 3C.

In one or more embodiments, copying, by the process, the OS executable of the IHS initialization executable/OS executable pair from the first non-volatile memory medium to the volatile memory medium may include copying, by the process, the OS executable of the IHS initialization executable/OS executable pair from the first non-volatile memory medium to an entry of a data structure stored by the volatile memory medium. In one example, process 175 may copy OSE 174B of initialization executable/OS executable pair 172B/174B from non-volatile memory medium 170 to entry 177B of data structure 176B stored by volatile memory medium 150, as illustrated in FIG. 3B. In another example, process 175 may copy OSE 174N of initialization executable/OS executable pair 172N/174N from non-volatile memory medium 170 to entry 177N of data structure 176B stored by volatile memory medium 150, as shown in FIG. 3C.

At 528, the at least one processor may execute the operating system setup executable. For example, processor 120 may execute OSSE 173A. For instance, processor 120 may execute OSSE 173A via OS environment 340. In one or more embodiments, an OS may be booted before the at least one processor may execute the operating system setup executable. For example, OS 162 may be booted before processor 120 executes OSSE 173A.

At 530, a driver may be retrieved via a network. In one example, OSSE 173A may retrieve driver 179 via network 105. In one instance, OSSE 173A may retrieve driver 179B from IHS 110B via network 105. In another instance, OSSE 173A may retrieve driver 179C from BMC 130 via network 105. In another example, OSE 174A may retrieve driver 179 via network 105. In one instance, OSE 174A may retrieve driver 179B from IHS 110B via network 105. In another instance, OSE 174A may retrieve driver 179C from BMC 130 via network 105. In one or more embodiments, OSSE 173A may retrieve driver 179C from BMC 130 via an internal communicatively coupling of IHS 110, as illustrated in FIG. 1D. In one or more embodiments, OSE 174A may retrieve driver 179C from BMC 130 via an internal communicatively coupling of IHS 110, as illustrated in FIG. 1D. In one or more embodiments, the driver may be retrieved based at least on driver information. For example, driver 179 may be retrieved based at least on driver information 180.

At 532, the at least one processor may execute the driver. For example, processor 120 may execute 179. In one or more embodiments, driver 179B may be retrieved from IHS 110B and stored as driver 179A. For example, processor 120 may execute 179A. In one or more embodiments, driver 179C may be retrieved from BMC 130 and stored as driver 179A. For example, processor 120 may execute 179A. In one or more embodiments, when OSSE 173A utilizes driver 179, processor 120 may execute driver 179. In one embodiment, when OSE 174A utilizes driver 179, processor 120 may execute driver 179.

At 534, the driver may copy each OS executable, which was copied to the volatile memory medium, to a second non-volatile memory medium of the IHS. For example, driver 179 may copy each OS executable 174, which was copied to volatile memory medium 150, to non-volatile memory medium 160 of IHS 110. For instance, driver 179 may copy OSEs 174B-174N, which was copied to volatile memory medium 150, to non-volatile memory medium 160 of IHS 110.

In one or more embodiments, OSE 174A may utilize driver 179 to copy each OS executable 174 of OSEs 174B-174N, which was copied to volatile memory medium 150, to non-volatile memory medium 160 of IHS 110. For example, OSE 174A may utilize driver 179 to copy OSEs 174B-174N, which was copied to volatile memory medium 150, to non-volatile memory medium 160 of IHS 110. In one or more embodiments, OSE 174A utilizing driver 179 to copy each OS executable 174 of OSEs 174B-174N, which was copied to volatile memory medium 150, to non-volatile memory medium 160 of IHS 110 may include OSE 174A utilizing driver 179 to retrieve each OS executable 174 of OSEs 174B-174N from volatile memory medium 150. In one or more embodiments, OSE 174A utilizing driver 179 to copy each OS executable 174 of OSEs 174B-174N, which was copied to volatile memory medium 150, to non-volatile memory medium 160 of IHS 110 may include OSE 174A utilizing driver 179 to write each OS executable 174 of OSEs 174B-174N to non-volatile memory medium 160 of IHS 110. In one or more embodiments, OSE 174A utilizing driver 179 to copy each OS executable 174 of OSEs 174B-174N, which was copied to volatile memory medium 150, to non-volatile memory medium 160 of IHS 110 may include OSE 174A writing each OS executable 174 of OSEs 174B-174N to non-volatile memory medium 160 of IHS 110.

In one or more embodiments, copying, by the driver, each OS executable, which was copied to the volatile memory medium, to the second non-volatile memory medium may include for each entry of the data structure: copying, by the driver, the OS executable from the entry of the data structure to the second non-volatile memory medium. In one example, driver 179 may copy OSE 174B from entry 177B of data structure 176B to non-volatile memory medium 160. For instance, OSE 174A may utilize driver 179 to copy OSE 174B from entry 177B of data structure 176B to non-volatile memory medium 160. In another example, driver 179 may copy OSE 174N from entry 177N of data structure 176B to non-volatile memory medium 160. For instance, OSE 174A may utilize driver 179 to copy OSE 174N from entry 177N of data structure 176B to non-volatile memory medium 160.

At 536, the at least one processor may execute each OS executable, which was copied to the second non-volatile memory medium, via an OS context of an operating system. For example, processor 120 may execute each OS executable 174 of OSEs 174B-174N, which was copied to the second non-volatile memory medium, via an OS context of OS 162.

In one or more embodiments, executing, by the at least one processor, each OS executable, which was copied to the second non-volatile memory medium, via the OS context of the operating system may include executing, by the at least one processor, each OS executable, which was copied to the second non-volatile memory medium, via the OS context of the operating system without executing an operating system setup executable configured to set up the OS executable. For example, executing, by the at least one processor, each OS executable 174 of OSEs 174B-174N, which was copied to non-volatile memory medium 160, via the OS context of OS 162 may include executing, by the at least one processor, each OS executable 174 of OSEs 174B-174N, which was copied to non-volatile memory medium 160, via the OS context of OS 162 without executing an OSSE 173 of OSSEs 173B-173N configured to set up OS executable 174 of OSEs 174B-174N. In one instance, OSE 174B may be executed without executing OSSE 173B. In another instance, OSE 174N may be executed without executing OSSE 173N. In one or more embodiments, driver 179 may set up one or more of OSEs 174B-174N.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor; and
a memory medium, coupled to the at least one processor, that stores instructions executable by the at least one processor, which when executed by the at least one processor, cause the information handling system (IHS) to:
    execute, by the at least one processor, at least a portion of IHS firmware (IHSFW) from a first non-volatile memory medium of the IHS;
    retrieve, from the first non-volatile memory medium, a first IHS initialization executable and an operating system setup executable;
    execute, by the at least one processor, the first IHS initialization executable via an environment associated with the IHSFW;
    register, by the first IHS initialization executable, a process configured to store a plurality of IHS initialization executable/OS executable pairs via a volatile memory medium of the IHS;
    copy, by the first IHS initialization executable, the operating system setup executable from the first non-volatile memory medium to the volatile memory medium;
    for each IHS initialization executable/OS executable pair of the plurality of IHS initialization executable/OS executable pairs:
        retrieve, from the first non-volatile memory medium, an IHS initialization executable of the IHS initialization executable/OS executable pair;
        execute, by the at least one processor, the IHS initialization executable via the environment associated with the IHSFW;
        call, by the IHS initialization executable, the process; and
        copy, by the process, an OS executable of the IHS initialization executable/OS executable pair from the first non-volatile memory medium to the volatile memory medium;
    execute, by the at least one processor, the operating system setup executable;
    retrieve, by the operating system setup executable, a driver via a network;
    execute, by the at least one processor, the driver; and
    copy, by the driver, each OS executable, which was copied to the volatile memory medium, to a second non-volatile memory medium of the IHS.

2. The information handling system of claim 1, wherein, to copy, by the process, the OS executable of the IHS initialization executable/OS executable pair from the first non-volatile memory medium to the volatile memory medium, the instructions further cause the information handling system to copy, by the process, the IHS initialization executable/OS executable pair from the first non-volatile memory medium to the volatile memory medium.

3. The information handling system of claim 1, wherein the instructions further cause the information handling system to execute, by the at least one processor, each OS executable, which was copied to the second non-volatile memory medium, via an operating system context of an operating system.

4. The information handling system of claim 3, wherein, to execute, by the at least one processor, each OS executable, which was copied to the second non-volatile memory medium, via the operating system context of the operating system, the instructions further cause the information handling system to execute, by the at least one processor, each OS executable, which was copied to the second non-volatile memory medium, via the operating system context of the operating system without executing an operating system setup executable configured to set up the OS executable.

5. The information handling system of claim 1, wherein, to retrieve, by the first OS executable, the driver via the network, the instructions further cause the information handling system to retrieve, by the first OS executable, the driver from a baseboard management controller of the information handling system via the network or from another information handling system via the network.

6. The information handling system of claim 1, wherein, to copy, by the process, the OS executable of the IHS initialization executable/OS executable pair from the first non-volatile memory medium to the volatile memory medium, the instructions further cause the information handling system to copy, by the process, the OS executable of the IHS initialization executable/OS executable pair from the first non-volatile memory medium to an entry of a data structure stored by the volatile memory medium.

7. The information handling system of claim 6, wherein, to copy, by the driver, each OS executable, which was copied to the volatile memory medium, to the second non-volatile memory medium, the instructions further cause the information handling system to, for each entry of the data structure, copy, by the driver, the OS executable from the entry of the data structure to the second non-volatile memory medium.

8. A method, comprising:
executing, by at least one processor of an information handling system (IHS), at least a portion of IHS firmware (IHSFW) from a first non-volatile memory medium of the IHS;
retrieving, from the first non-volatile memory medium, a first IHS initialization executable and an operating system setup executable;
executing, by the at least one processor, the first IHS initialization executable via an environment associated with the IHSFW;
registering, by the first IHS initialization executable, a process configured to store a plurality of IHS initialization executable/OS executable pairs via a volatile memory medium of the IHS;
copying, by the first IHS initialization executable, the operating system setup executable from the first non-volatile memory medium to the volatile memory medium;
for each IHS initialization executable/OS executable pair of the plurality of IHS initialization executable/OS executable pairs:
retrieving, from the first non-volatile memory medium, an IHS initialization executable of the IHS initialization executable/OS executable pair;
executing, by the at least one processor, the IHS initialization executable via the environment associated with the IHSFW;
calling, by the IHS initialization executable, the process; and
copying, by the process, an OS executable of the IHS initialization executable/OS executable pair from the first non-volatile memory medium to the volatile memory medium;
executing, by the at least one processor, the operating system setup executable;
retrieving, by the operating system setup executable, a driver via a network;
executing, by the at least one processor, the driver; and
copying, by the driver, each OS executable, which was copied to the volatile memory medium, to a second non-volatile memory medium of the IHS.

9. The method of claim 8, wherein the copying, by the process, the OS executable of the IHS initialization executable/OS executable pair from the first non-volatile memory medium to the volatile memory medium includes copying, by the process, the IHS initialization executable/OS executable pair from the first non-volatile memory medium to the volatile memory medium.

10. The method of claim 8, further comprising:
executing, by the at least one processor, each OS executable, which was copied to the second non-volatile memory medium, via an operating system context of an operating system.

11. The method of claim 10, wherein the executing, by the at least one processor, each OS executable, which was copied to the second non-volatile memory medium, via the operating system context of the operating system includes executing, by the at least one processor, each OS executable, which was copied to the second non-volatile memory medium, via the operating system context of the operating system without executing an operating system setup executable configured to set up the OS executable.

12. The method of claim 8, wherein the retrieving, by the first OS executable, the driver via the network includes retrieving, by the first OS executable, the driver from a baseboard management controller of the IHS via the network or from another IHS via the network.

13. The method of claim 8, wherein the copying, by the process, the OS executable of the IHS initialization executable/OS executable pair from the first non-volatile memory medium to the volatile memory medium includes copying, by the process, the OS executable of the IHS initialization executable/OS executable pair from the first non-volatile memory medium to an entry of a data structure stored by the volatile memory medium.

14. The method of claim 13, wherein the copying, by the driver, each OS executable, which was copied to the volatile memory medium, to the second non-volatile memory medium includes for each entry of the data structure: copying, by the driver, the OS executable from the entry of the data structure to the second non-volatile memory medium.

15. A computer-readable non-transitory memory medium that includes instructions that, when executed by at least one processor of an information handling system (IHS), cause the IHS to:
execute, by the at least one processor, at least a portion of IHS firmware (IHSFW) from a first non-volatile memory medium of the IHS;
retrieve, from the first non-volatile memory medium, a first IHS initialization executable and an operating system setup executable;
execute, by the at least one processor, the first IHS initialization executable via an environment associated with the IHSFW;

register, by the first IHS initialization executable, a process configured to store a plurality of IHS initialization executable/OS executable pairs via a volatile memory medium of the IHS;

copy, by the first IHS initialization executable, the operating system setup executable from the first non-volatile memory medium to the volatile memory medium;

for each IHS initialization executable/OS executable pair of the plurality of IHS initialization executable/OS executable pairs:
retrieve, from the first non-volatile memory medium, an IHS initialization executable of the IHS initialization executable/OS executable pair;
execute, by the at least one processor, the IHS initialization executable via the environment associated with the IHSFW;
call, by the IHS initialization executable, the process; and
copy, by the process, an OS executable of the IHS initialization executable/OS executable pair from the first non-volatile memory medium to the volatile memory medium;

execute, by the at least one processor, the operating system setup executable;
retrieve, by the operating system setup executable, a driver via a network;
execute, by the at least one processor, the driver; and
copy, by the driver, each OS executable, which was copied to the volatile memory medium, to a second non-volatile memory medium of the IHS.

16. The computer-readable non-transitory memory medium of claim 15, wherein, to copy, by the process, the OS executable of the IHS initialization executable/OS executable pair from the first non-volatile memory medium to the volatile memory medium, the instructions further cause the information handling system to copy, by the process, the IHS initialization executable/OS executable pair from the first non-volatile memory medium to the volatile memory medium.

17. The computer-readable non-transitory memory medium of claim 15, wherein the instructions further cause the information handling system to execute, by the at least one processor, each OS executable, which was copied to the second non-volatile memory medium, via an operating system context of an operating system.

18. The computer-readable non-transitory memory medium of claim 17, wherein, to execute, by the at least one processor, each OS executable, which was copied to the second non-volatile memory medium, via the operating system context of the operating system, the instructions further cause the information handling system to execute, by the at least one processor, each OS executable, which was copied to the second non-volatile memory medium, via the operating system context of the operating system without executing an operating system setup executable configured to set up the OS executable.

19. The computer-readable non-transitory memory medium of claim 15, wherein, to retrieve, by the first OS executable, the driver via the network, the instructions further cause the information handling system to retrieve, by the first OS executable, the driver from a baseboard management controller of the information handling system via the network or from another information handling system via the network.

20. The computer-readable non-transitory memory medium of claim 15, wherein, to copy, by the process, the OS executable of the IHS initialization executable/OS executable pair from the first non-volatile memory medium to the volatile memory medium, the instructions further cause the information handling system to copy, by the process, the OS executable of the IHS initialization executable/OS executable pair from the first non-volatile memory medium to an entry of a data structure stored by the volatile memory medium.

* * * * *